(12) United States Patent
Hochstetler et al.

(10) Patent No.: US 11,609,205 B2
(45) Date of Patent: Mar. 21, 2023

(54) PHYSICAL VAPOR DEPOSITED BIOSENSOR COMPONENTS

(71) Applicant: EASTMAN CHEMICAL COMPANY, Kingsport, TN (US)

(72) Inventors: Spencer Erich Hochstetler, Kingsport, TN (US); Dennis Lee Ashford, II, Johnson City, TN (US); Senthil Nathan Sambandam, Fairfax, VA (US)

(73) Assignee: Eastman Chemical Company, Kingsport, TN (US)

( * ) Notice: Subject to any disclaimer, the term of this patent is extended or adjusted under 35 U.S.C. 154(b) by 87 days.

(21) Appl. No.: 17/056,785

(22) PCT Filed: May 20, 2019

(86) PCT No.: PCT/US2019/033060
§ 371 (c)(1),
(2) Date: Nov. 19, 2020

(87) PCT Pub. No.: WO2019/226517
PCT Pub. Date: Nov. 28, 2019

(65) Prior Publication Data
US 2021/0123881 A1   Apr. 29, 2021

Related U.S. Application Data

(60) Provisional application No. 62/674,764, filed on May 22, 2018.

(51) Int. Cl.
*G01N 27/327* (2006.01)

(52) U.S. Cl.
CPC ................ *G01N 27/3273* (2013.01)

(58) Field of Classification Search
CPC .......... G01N 27/3273; G01N 27/3271; G01N 27/4035; G01N 33/66
See application file for complete search history.

(56) References Cited

U.S. PATENT DOCUMENTS

| 3,264,074 A | * | 8/1966 | Jones ............... H01J 17/492 |
| | | | 428/653 |
| 2004/0118705 A1 | * | 6/2004 | Khan ............... G01N 33/525 |
| | | | 205/792 |

(Continued)

FOREIGN PATENT DOCUMENTS

| CN | 102459690 A | * | 5/2012 | ......... G01N 27/3272 |
| JP | 2014153280 A | * | 8/2014 | |
| WO | WO-2016065190 A1 | * | 4/2016 | ........... A61B 5/1486 |

OTHER PUBLICATIONS

Inconel., Inconel Alloy 6000 data sheet, Sep. 2008 (Year: 2008).*

(Continued)

*Primary Examiner* — Joshua L Allen
*Assistant Examiner* — Shizhi Qian
(74) *Attorney, Agent, or Firm* — Michael K. Carrier; Robert C. Morriss

(57) ABSTRACT

A biosensor component that provides enhanced characteristics for use in biosensors, such as blood glucose sensors. The biosensor component comprises a substrate, and a composite layer deposited on the substrate. The composite layer includes a conductive metal component and a resistive material component, where the conductive metal component comprises one or more non-noble metals, and where the resistive material component in the composite layer is present in an amount greater than 20 atomic percent.

21 Claims, 9 Drawing Sheets

(56) References Cited

U.S. PATENT DOCUMENTS

| | | | |
|---|---|---|---|
| 2005/0012115 A1* | 1/2005 | Grueger | G01N 27/414 |
| | | | 257/192 |
| 2010/0213079 A1* | 8/2010 | Willis | G01N 27/3273 |
| | | | 204/403.06 |
| 2012/0118735 A1* | 5/2012 | Kim | G01N 27/3272 |
| | | | 204/403.02 |
| 2014/0014512 A1* | 1/2014 | Hong | G01N 27/30 |
| | | | 204/415 |
| 2016/0169827 A1* | 6/2016 | Hochstetler | G01N 33/553 |
| | | | 204/403.14 |
| 2017/0184534 A1* | 6/2017 | Goodwin | C23C 14/205 |

OTHER PUBLICATIONS

PCT International Search Report and Written Opinion dated Aug. 13, 2019 for International Application No. PCT/US2019/033060.

Onoprienko et al., "Role of Microstructure in Forming Thin Carbon Film Properties", Diamond Related Materials, 3, 1994, pp. 1132-1136.

Cho et al., "Chemical Structure and Physical Properties of Diamond-Like Amorphous Carbon Films Prepared by Magnetron Sputtering", J. Mater. Res. 1990, 5, pp. 2543-2554.

\* cited by examiner

PHYSICAL VAPOR DEPOSITED BIOSENSOR COMPONENTS

CROSS-REFERENCE TO RELATED APPLICATION(S)

This application is a national stage filing under 35 USC § 371 of International Application Number PCT/US2019/033060, filed on, May 20, 2019 which claims the benefit of the filing date to U.S. Provisional Application No. 62/674,764, filed on May 22, 2018, the entire disclosures of which are incorporated by reference herein.

FIELD OF INVENTION

The present invention is generally related to electrodes, for example, physical vapor deposited components for electrodes such as those found in biosensors. More particularly, the present invention is related to electrodes formed with non-noble metal alloys, for example, those found in biosensor components.

DESCRIPTION OF THE RELATED ART

Biosensors for use in analyzing biological samples are becoming increasingly prevalent. For example, with the rise in cases of diabetes in the world's population, the need for biosensors for measuring blood glucose has risen dramatically. Such biosensors are generally known as glucometers and operate by having a user place a drop of blood on a test-strip associated with the glucometer. The test-strip is configured to be reactive to the amount of glucose in the drop of blood, such that the glucometer can detect and display a glucose level of the user's blood.

The test-strips for glucometer-type biosensors are generally formed with two or more electrodes (e.g., a working electrode and a counter electrode) formed on a substrate. In addition, a bio-reactant that reacts with the biological sample, e.g., an enzyme (e.g., glucose oxidase, glucose dehydrogenase, or the like), and a mediator (e.g., ferricyanide, ruthenium complexes, osmium complexes, quinones, phenothiazines, phenoxazines, or the like) will be formed on one or both electrodes, e.g., the working electrode. In operation of a glucometer-type biosensor, a drop of blood will be applied to a test-strip. Thereafter, an electrochemical reaction proportional to the amount of glucose in the blood will take place on the working electrode. In more detail, glucose first reacts with the bio-reactant, e.g., enzyme (glucose oxidase, glucose dehyrogenase, or the like) and sometimes an enzyme cofactor (PQQ, FAD, or the like) and is oxidized to gluconic acid. The bio-reactant, e.g., enzyme, cofactor, or enzyme-cofactor complex, is temporarily reduced by two electrons transferred from glucose to the enzyme, cofactor, or enzyme-cofactor complex. Next, the reduced bio-reactant, e.g., enzyme, cofactor, or enzyme-cofactor complex, reacts with the mediator, transferring a single electron to each of two mediator species (molecules or complexes), in the case of a mediator that is reduced in a one-electron process. When the mediator species are reduced, the enzyme, cofactor, or enzyme-cofactor complex is thus returned to its original oxidation state. Then, the reduced mediators diffuse to the electrode surface where a pre-determined and sufficiently oxidizing potential is applied to the biosensor so that the reduced mediators are oxidized back to their original oxidation state. The current that is generated by the oxidation of the mediator species by the biosensor is measured and related proportionally to the amount of glucose in the blood.

The quality of the working electrode plays an important role in an accurate measurement of the glucose level of the blood. Specifically, the reproducibility of the electroactive surface area of the electrode, the lot-to-lot repeatability of the electron transfer kinetics of the electrode in a particular glucose measurement arrangement, and long term stability of the electrode material while in storage so that the electrochemical signal that arises from the electrode when the assay is in operation are all factors that lead to improved accuracy of blood glucose test strips. Particularly, it is important that the electrical signals resulting from the electro-activity of the electrode is minimized to prevent bias or noise in the measurement and analysis of biological samples. Typically, this is accomplished by using electrode materials that are intrinsically thermodynamically noble, such as gold, palladium, platinum, iridium, and the like. As such, most current glucometers use electrodes formed from substrates coated with palladium, gold, or other noble metals, generally in the purest form commercially feasible, to function as the working electrode, and for ease of manufacturing, often for the counter electrode or a combined counter and reference electrode. Such noble metals are minimally reactive with interfering substances, and as a result, offer enhanced chemical resistance for consistent and accurate measurements. However, the cost of using such noble metals in electrodes can be prohibitive.

There have been some attempts to use electrodes formed with non-noble metals, so as to reduce manufacturing costs of biosensors. However, such non-noble metal electrodes will generally have an electrochemical response (e.g., dose-responses) that deviates significantly from the electrochemical response of electrodes formed with noble metals. Non-noble materials typically are not anodically stable enough to be used for electrochemical test strips because of high background currents generated when operating at typical voltages of biosensors. In addition, non-precious materials typically do not have facile heterogeneous electron transfer with the desired analyte. As such, electrodes formed with non-noble metals are generally inadequate for use as direct replacements for noble metals in test-strips for many types of biosensors. In addition to having a low electrical response, it is also desirable for a biosensor electrode to have sufficient electron transfer kinetics with the mediator. While some suggested non-noble metals have a relatively low electrochemical response (or reasonable anodic stability), they do not also have acceptable electron transfer kinetics with a mediator.

Accordingly, there is a need for an electrode which can provide consistent and accurate measurements, while providing a cost-effective alternative to the use of noble metals, for example, in biosensors. In particular, there is a need for an electrode formed from a non-noble metal alloy that can be used in a biosensor component to consistently and accurately measure biological samples.

SUMMARY

It has been found that electrodes formed by depositing conductive non-noble metals on a substrate film to form a conductive layer can be significantly improved by depositing the conductive non-noble metal in the form of a composite with a resistive material for biosensor applications.

One or more embodiments of the present disclosure can relate to an electrode which can comprise a substrate, and at least one composite layer deposited on the substrate, wherein the composite layer comprises a conductive metal component and a resistive material component, wherein the conductive metal component comprises at least one non-noble metal and the resistive material component comprises at least one resistive material, and wherein the amount of resistive component is at least 20 weight percent based on the total weight of the composite layer. In one embodiment, the conductive metal component comprises chromium and the resistive material layer comprises carbon.

In certain embodiments of a first aspect of the invention, the conductive metal component can comprise a metal chosen from Ni, Cr, Mo, Mn, Cu, Ti, Co, Al, Fe, W, S, P, V, Nb, Zr, or combinations thereof. In certain embodiments, the conductive metal component comprises Cr, Ni or a combination of these. In one embodiment, the conductive metal component comprises Cr. In one embodiment, the conductive metal component is Cr. In certain embodiments, the conductive layer can comprise nickel and chromium wherein the combined weight percent of the nickel and chromium in the conductive layer can be at least 24, or at least 25, or at least 50, or at least 60, or at least 70, or at least 80, or at least 90, or at least 95 weight percent, based on the total weight of the conductive layer. In certain embodiments, the conductive layer can comprise nickel in an amount less than 80 weight percent and chromium in an amount of greater than 20 weight percent, based on the total weight of the conductive layer. In certain embodiments, the conductive layer can comprise nickel and chromium wherein the nickel is present in an amount of at least 4, or 5, or 6, or 8 weight percent and the chromium is present in an amount of at least 10 weight percent, based on the weight of the conductive layer. In one embodiment, the thickness of the resistive material layer is less than 20 nm. In certain embodiments, the resistive material layer allows fluid communication between an outside liquid, e.g., saline solution or bio-reactant containing liquid coating, and the conductive layer.

In one embodiment, the conductive layer can comprise nickel and chromium wherein the combined weight percent of the nickel and chromium in the conductive layer can be in the range of 24 or 25 to less than 95 weight percent, at least 10 weight percent chromium, and at least 4, or 5, or 6, or 8 weight percent nickel, based on the total weight of the conductive layer. In addition to nickel and chromium, the conductive layer can also comprise iron wherein the iron is present in an amount greater than 2 weight percent, based on the total weight of the conductive layer equaling 100 weight percent. In embodiments, the conductive layer can comprise 0 to less than 20, or 0 to 17, or 0 to 13, or 0 to 10, or 0 to 9, or 0 to 8, or 0 to 7, or 0 to 6, or 0 to 5, or 0 to 4, or 0 to 3, or 0 to 2, or 0 to 1, or 0 to 0.5, or 0 to 0.1, weight percent molybdenum. In certain embodiments, the conductive layer can comprise 2 to 10, or 2 to 8, or 2 to 7.5, or 2 to 7.0, or 2 to 6.5, or 2.5 to 8, or 2.5 to 7.5, or 2.5 to 7.0, or 2.5 to 6.5, or 3 to 8, or 3 to 7.5, or 3 to 7.0, or 3 to 6.5, or 3.5 to 8, or 3.5 to 7.5, or 3.5 to 7.0, or 3.5 to 6.5, or 4 to 8, or 4 to 7.5, or 4 to 7.0, or 4 to 6.5, or 4.5 to 8, or 4.5 to 7.5, or 4.5 to 7.0, or 4.5 to 6.5, weight percent molybdenum. In certain embodiments, the conductive layer can comprise 2 to 6.5, or 2 to 6.0, or 2 to 5.5, or 2 to 5, or 2 to 4.5, or 2 to 4, or 2.5 to 6.5, or 2.5 to 6.0, or 2.5 to 5.5, or 2.5 to 5, or 2.5 to 4.5, or 2.5 to 4, or 3 to 6.5, or 3 to 6.0, or 3 to 5.5, or 3 to 5, or 3 to 4.5, or 3 to 4, or 3.5 to 6.5, or 3.5 to 6.0, or 3.5 to 5.5, or 3.5 to 5, or 3.5 to 4.5, or 4 to 6.5, or 4 to 6.0, or 4 to 5.5, or 4 to 5, or 4.5 to 6, or 4.5 to 5.5, or 5 to 6, weight percent molybdenum. While most of this disclosure relates to electrodes used as biosensor components, it is contemplated that the electrodes can be used in other end-use applications as well. As a result, any disclosure herein related to electrodes used in biosensors is intended to incorporate herein applicability to all electrodes that this technology could reasonably be applied to by one of ordinary skill in the art.

In certain embodiments of a second aspect of the invention, the conductive metal component can comprise nickel and chromium wherein the combined weight percent of the nickel and chromium in the conductive metal component can be at least 50, or at least 60, or at least 70, or at least 80, or at least 90, or at least 95 weight percent, based on the total weight of the conductive metal component. In certain embodiments, the conductive metal component can comprise nickel in an amount less than 80 weight percent and chromium in an amount of greater than 20 weight percent, based on the total weight of the conductive metal component.

In embodiments of a third aspect, the conductive metal component can comprise nickel and chromium wherein the nickel is present in an amount of at least 4, or 5, or 6, or 8 weight percent and the chromium is present in an amount of at least 10 weight percent, based on the weight of the conductive metal component.

In one embodiment of the third aspect, the conductive metal component can comprise nickel and chromium wherein the combined weight percent of the nickel and chromium in the conductive metal component can be in the range of 24 to less than 95 weight percent, at least 10 weight percent chromium, and at least 4, or 5, or 6, or 8 weight percent nickel, based on the total weight of the conductive metal component. In addition to nickel and chromium, in certain embodiments, the conductive metal component can also comprise iron wherein the iron is present in an amount greater than 2 weight percent, based on the total weight of the conductive metal component equaling 100 weight percent.

In a fourth aspect, the conductive metal component can comprise nickel and chromium wherein the combined weight percent of the nickel and chromium in the conductive metal component can be in the range of 24 to 95 weight percent, 25 to 90 weight percent, or 26 to 89 weight percent, based on the total weight of the conductive metal component equaling 100 weight percent. In addition to nickel and chromium, the conductive metal component can also comprise iron wherein the weight percent of the iron in the conductive metal component can be in the range of greater than 5 weight percent to less than 75 weight percent, or about 6 to about 74 weight percent, based on the total weight of the conductive metal component equaling 100 weight percent.

In embodiments of the fourth aspect, the conductive metal component can comprise nickel in the range of greater than 7 weight percent and chromium in the range of greater than 13 to less than 21 weight percent and wherein the total combined weight percent of the nickel and chromium in the conductive metal component is in the range of greater than 24 to less than 95 weight percent, or greater than 25 to less than 90 weight percent, or 26 to 89 weight percent, based on the total weight of the conductive metal component equaling 100 weight percent.

In a fifth aspect, the conductive metal component can comprise nickel and chromium wherein the combined weight percent of the nickel and chromium in the conductive metal component can be in the range of 80 to less than 95 weight percent, or 81 to 94 weight percent, or 82 to 94 weight percent, or 83 to 94 weight percent, or 85 to 94 weight percent, or 86 to 94 weight percent, based on the total weight of the conductive metal component equaling 100 weight percent. In addition to nickel and chromium, the conductive metal component can also comprise iron wherein the weight percent of the iron in the conductive metal component can be in the range of greater than 5 weight percent to less than 12 weight percent, or about 6 to about 11 weight percent, or 6 to 11 weight percent, or 6 to 10 weight percent, or 6 to 9 weight percent, or 7 to 10 weight percent, or 7 to 9 weight percent, or about 9 weight percent, based on the total weight of the conductive metal component equaling 100 weight percent.

In embodiments of the fifth aspect, the conductive metal component can comprise nickel in the range of greater than 70 weight percent and chromium in the range of greater than 13 to less than 20 weight percent and wherein the total combined weight percent of the nickel and chromium in the conductive metal component is in the range of greater than 80 to less than 95 weight percent, or 81 to 94 weight percent, or 82 to 94 weight percent, or 83 to 94 weight percent, or 85 to 94 weight percent, or 86 to 94 weight percent, based on the total weight of the conductive metal component equaling 100 weight percent.

In a sixth aspect, the conductive layer can comprise nickel and chromium wherein the combined weight percent of the nickel and chromium in the conductive layer can be in the range of 24, or 25, to 90 weight percent, or 26 to 89 weight percent, based on the total weight of the conductive layer equaling 100 weight percent. In addition to nickel and chromium, the conductive layer can also comprise iron wherein the weight percent of the iron in the conductive layer can be in the range of greater than 5 weight percent to less than 75 weight percent, or about 6 to about 74 weight percent, based on the total weight of the conductive layer equaling 100 weight percent.

In embodiments of the sixth aspect, the conductive layer can comprise nickel in the range of greater than 7 weight percent and chromium in the range of greater than 13 to less than 25, or less than 21, weight percent and wherein the total combined weight percent of the nickel and chromium in the conductive layer is in the range of greater than 24, or greater than 25, to less than 90 weight percent, or 26 to 89 weight percent, based on the total weight of the conductive layer equaling 100 weight percent.

In further embodiments of the sixth aspect, the conductive layer can comprise nickel in the range of 8 to 72 weight percent, chromium in the range of about 14 to about 25, or 14 to about 20 weight percent, and iron in the range of about 6 to about 74 weight percent and wherein the total combined weight percent of the nickel and chromium in the conductive layer is in the range of about 24 or about 25 to about 90 weight percent, or 26 to 89 weight percent, based on the total weight of the conductive layer equaling 100 weight percent.

In certain embodiments of the sixth aspect, the conductive layer can comprise nickel in the range of 8 to 72 weight percent, chromium in the range of 14 to 25 or 14 to 20 weight percent, and iron in the range of 6 to 74 weight percent, based on the total weight of the conductive layer equaling 100 weight percent.

In certain embodiments of the sixth aspect, the conductive layer can comprise nickel in the range of 8 to 72 weight percent, chromium in the range of 14 to 25, or 14 to 20 weight percent, iron in the range of 6 to 74 weight percent, and molybdenum in the range of 0 to 10 weight percent, based on the total weight of the conductive layer equaling 100 weight percent, and wherein the conductive layer does not include any other element species that is present in an amount greater than 6 weight percent, or greater than 5 weight percent, or greater than 4 weight percent, or greater than 3 weight percent or greater than 2 weight percent, based on the total weight of the conductive layer equaling 100 weight percent. In one embodiment, the conductive layer further comprises molybdenum in the range of 0.01 to 7.0 weight percent and manganese in the range of 0.01 to 6.0 weight percent, and does not include any other element species that is present in an amount greater than 1.5 weight percent or greater than 1.0 weight percent, based on the total weight of the conductive layer equaling 100 weight percent. In one embodiment, the conductive layer further comprises manganese in the range of 0.01 to 2.0 weight percent, and does not include any other element species that is present in an amount greater than 1.0 weight percent, based on the total weight of the conductive layer equaling 100 weight percent.

In certain embodiments of the sixth aspect, the conductive layer can comprise nickel in the range of 8 to 72 weight percent, chromium in the range of 14 to 24 or 14 to 20 weight percent, and iron in the range of 6 to 74 weight percent, based on the total weight of the conductive layer equaling 100 weight percent, and wherein the conductive layer further comprises manganese in the range of 0.01 to 2.0 weight percent, silicon in the range of 0.01 to 1.0 weight percent, molybdenum in the range of 0 to 3.0 weight percent, and copper in the range of 0 to 0.5 weight percent, based on the total weight of the conductive layer equaling 100 weight percent. In an embodiment, the conductive layer contains less than 0.2 weight percent of each of the following element species: carbon, sulfur, phosphorous, niobium, cobalt, aluminum, titanium, or boron. In an embodiment, the conductive layer contains none, or is substantially free, of the following element species: niobium, cobalt, aluminum, titanium, or boron. In an embodiment, the conductive layer contains none of the following element species: niobium, cobalt, aluminum, titanium, or boron. In an embodiment, the conductive layer contains less than 0.2 weight percent of each of the following element species: carbon, sulfur, phosphorous, molybdenum, niobium, cobalt, aluminum, titanium, or boron. In an embodiment, the conductive layer contains none, or is substantially free, of the following element species: molybdenum, niobium, cobalt, aluminum, titanium, or boron. In an embodiment, the conductive layer contains none of the following element species: molybdenum, niobium, cobalt, aluminum, titanium, or boron.

In a seventh aspect, the conductive metal component can comprise nickel and chromium wherein the combined weight percent of the nickel and chromium in the conductive metal component can be in the range of 24 to 55, or 25 to 33 weight percent, or greater than 25 and less than 33 weight percent, or 25 to less than 32 weight percent, or 26 to 31 weight percent, or 26 to 30.5 weight percent, based on the total weight of the conductive metal component equaling 100 weight percent. In some embodiments, the combined weight percent of the nickel and chromium in the conductive layer can be in the range of 25 to less than 32 weight percent, or 26 to 31 weight percent, or 26 to 30.5 weight percent, or 28 to 32 weight percent, or 38 to 49 weight percent, or 42 to 47 weight percent, based on the total weight of the conductive layer equaling 100 weight percent. In some embodiments, the combined weight percent of the nickel and chromium in the conductive layer can be in the range of 25 to less than 33 weight percent, or 26 to 32 weight percent, based on the total weight of the conductive layer equaling 100 weight percent.

In this seventh aspect, in addition to nickel and chromium, the conductive layer can also comprise iron wherein the weight percent of the iron in the conductive layer can be in the range of at least 35 weight percent, or at least 44 weight percent, or at least 60 weight percent to less than 75 weight percent, or greater than 60 weight percent to less than 75 weight percent, or greater than 61 weight percent to less than 75 weight percent, or greater than 61 weight percent to 74 weight percent, based on the total weight of the conductive layer equaling 100 weight percent. In some embodiments, the weight percent of the iron in the conductive layer is in the range of 61 to 75, or 65 to 75, or greater than 65 to less than 75, or 66 to less than 75, or greater than 66 to 74. In some embodiments, the weight percent of the iron in the conductive layer is 60 to 73 weight percent, greater than 60 to less than 73 weight percent, or greater than 61 weight percent to less than 73 weight percent, or greater than 61.5 weight percent up to 72 weight percent, or about 61.85 to about 72 weight percent, based on the total weight of the conductive layer equaling 100 weight percent. In some embodiments, the weight percent of the iron in the conductive layer is 44 to 73 weight percent, or 44 to 50 weight percent, or 44 to 48 weight percent, or 44 to 46 weight percent, based on the total weight of the conductive layer equaling 100 weight percent.

In embodiments of the seventh aspect, the conductive metal component can comprise nickel in the range of 7 to less than 12 weight percent and chromium in the range of greater than 16 to less than 22 weight percent and wherein the total combined weight percent of the nickel and chromium in the conductive metal component is in the range of 25 to less than 32 weight percent, or 26 to 31 weight percent, or 26 to 30.5 weight percent, based on the total weight of the conductive metal component equaling 100 weight percent.

In certain embodiments of the seventh aspect, the conductive metal component can comprise nickel in the range of 8 to 10.5 weight percent, chromium in the range of 18 to 20 weight percent, and iron in the range of 66 to 74 weight percent, based on the total weight of the conductive metal component equaling 100 weight percent.

In an eighth aspect, the conductive layer can comprise nickel in the range of 10 to 30 weight percent, or greater than 10 and less than 30 weight percent, or 11 to 29 weight percent; chromium in the range of 17 to 26 weight percent, or greater than 17 to less than 26 weight percent, or 18 to 25 weight percent; and molybdenum in the range of 2 to 8 weight percent, or greater than 2 and less than 8 weight percent, or 2.5 to 7 weight percent, based on the total weight of the conductive layer equaling 100 weight percent.

In embodiments of the eighth aspect, the conductive layer can comprise nickel in the range of 10 to 16 weight percent, or greater than 10 and less than 16 weight percent, or 11 to 15 weight percent; chromium in the range of 17 to 21 weight percent, or greater than 17 to less than 21 weight percent, or 18 to 20 weight percent; molybdenum in the range of 2 to 5 weight percent, or greater than 2 and less than 5 weight percent, or 3 to 4 weight percent; and iron in the range of 55 to 70 weight percent, or greater than 55 to less than 70 weight percent, or 57 to 68 weight percent, based on the total weight of the conductive layer equaling 100 weight percent.

In embodiments of the eighth aspect, the conductive layer can comprise nickel in the range of 12.5 to 29 weight percent, or greater than 12.5 and less than 29 weight percent, or 13.5 to 28 weight percent; chromium in the range of 16 to 24 weight percent, or greater than 16 to less than 24 weight percent, or 17 to 23 weight percent; molybdenum in the range of 3 to 6 weight percent, or greater than 3 and less than 6 weight percent, or 4 to 5 weight percent; and iron in the range of 46 to 66 weight percent, or greater than 46 to less than 66 weight percent, or 47 to 65 weight percent, based on the total weight of the conductive layer equaling 100 weight percent.

In embodiments of the eighth aspect, the conductive layer can comprise nickel in the range of 16 to 26.5 weight percent, or greater than 16 and less than 26.5 weight percent, or 17 to 25.5 weight percent; chromium in the range of 18 to 23 weight percent, or greater than 18 to less than 23 weight percent, or 19 to 22 weight percent; molybdenum in the range of 5 to 8 weight percent, or greater than 5 and less than 8 weight percent, or 6 to 7 weight percent; and iron in the range of 41 to 62 weight percent, or greater than 41 to less than 62 weight percent, or 42 to 61 weight percent, based on the total weight of the conductive layer equaling 100 weight percent.

In embodiments of the eighth aspect, the conductive layer does not include any other element species (in addition to those specified above) that is present in an amount greater than 2 weight percent, based on the total weight of the conductive layer equaling 100 weight percent. In one embodiment, the conductive layer further comprises manganese in the range of 0.01 to 2.0 weight percent and silicon in the range of 0.01 to 1.0 weight percent, and does not include any other element species that is present in an amount greater than 0.2, or 0.1, or 0.05 weight percent, based on the total weight of the conductive layer equaling 100 weight percent.

In embodiments of the invention, the conductive layer is metal comprising or produced from one or more of the following alloys: Stainless Steel (SS) 354 SMO, SS 304, SS 316, SS 317L, SS 317LM, SS 317LMN, SS 904, SS AL-6XN, or SS Alloy 24. In embodiments of the invention, the conductive layer is metal chosen from one or more of the following alloys: Stainless Steel (SS) 354 SMO, SS 304, SS 316, SS 317L, SS 317LM, SS 317LMN, SS 904, SS AL-6XN, or SS Alloy 24.

In embodiments of the various aspects of the invention, the resistive material comprises carbon. In certain embodiments, the resistive material is carbon deposited by sputtering. In certain embodiments, the resistive material is carbon deposited by sputtering using a composite source that contains both a solid carbon component and a conductive metal component to form the composite layer. In certain embodiments, the resistive material is carbon deposited by sputtering using a solid carbon source along with a separate conductive metal source to form the composite layer.

In certain embodiments of the present disclosure, the composite layer can be coated on the substrate, that can be comprised of at least one of any polymer described in the art and/or described herein including but not limited to polycarbonate, silicone polymers, acrylics, PET, modified PET such as PETG or PCTG, PCT, modified PCT, polyesters comprising TMCD AND CHDM, PCCD, or PEN, by physical vapor deposition.

In certain embodiments of the disclosure, the resistive material component can comprise resistive material deposited, along with a conductive metal component, in the form of a composite layer on the surface of the substrate layer. By the term "resistive material" is meant a material that is more electrically resistive than the conductive metal component, allows current to flow upon application of a constant potential, and, when formed into a thin film electrode having a composite layer, of a conductive metal component and a resistive material component, on the substrate layer, increases the electrode's anodic stability and/or increases electron transfer kinetics, as determined by a Type 1 Linear Sweep Voltammetry Test, compared to a similar electrode with just a layer of the conductive metal component.

In certain embodiments, the resistive material can comprise one or more elements chosen from carbon, silicon, boron, oxygen, and combinations thereof. In certain embodiments, the resistive material comprises carbon. In certain embodiments, the resistive material comprises amorphous carbon. In certain embodiments, the resistive material is amorphous carbon deposited by sputtering. In certain embodiments, the resistive material is amorphous carbon deposited by sputtering using a carbon or carbon containing source. In certain embodiments, the resistive material is amorphous carbon deposited by sputtering using a composite source containing both carbon and conductive metal. In certain embodiments, the resistive material is carbon deposited by co-sputtering, which may be accomplished by using two or more separate sources where a metal or metallic alloy target is sputtered in one source or several sources and a carbon target is sputtered in another source or several sources simultaneously and in the same deposition zone so that the metals and carbon are intimately co-deposited onto a substrate to form a metal-carbon composite film on said substrate. Because the sources are separate they may be operated with similar or different voltage, current, or frequency characteristics or further, in different operational modes such as direct current, pulsed magnetron, or radio frequency sputtering and the like.

In certain embodiments, the resistive material component comprises amorphous carbon that is composed primarily of $sp^2$ hybridized carbon, $sp^3$ hybridized carbon, or combinations thereof. In certain embodiments, an amorphous carbon layer composed primarily of $sp^2$ hybridized carbon, $sp^3$ hybridized carbon, or combinations thereof can be formed using techniques/processes as suggested by: Onoprienko, A. A., Shaginyan, L. R., Role of microstructure in forming thin carbon film properties. Diamond Relat. Mater. 1994, 3, 1132-1136; Onoprienko, A., In Carbon, The Future Material for Advanced Technology Applications; Messina, G., Santangelo, S., Eds.; Springer Berlin Heidelberg, 2006; or Cho, N. H.; Krishnan, K. M.; Veirs, D. K.; Rubin, M. D.; Hopper, C. B.; Bhushan, B.; Bogy, D. B., Chemical structure and physical properties of diamond-like amorphous carbon films prepared by magnetron sputtering. J. Mater. Res. 1990, 5, 2543-2554; except that the carbon is co-sputtered with the conductive metal component.

In certain embodiments of the disclosure, the composite layer can have a thickness in the range from 5 to 400 nm, and the substrate can have a thickness in the range from 25 and 500 µm. In certain embodiments, the composite layer can have a thickness in the range from 5 to less than 300 nm, and the substrate can have a thickness in the range from 25 and 500 µm. In certain embodiments, the biosensor component can also have visible light transmission of no more than 20% or no more than 15% or no more than 10% or no more than 5 or from 0.01 to 20% or from 0.01 to 15% or from 0.01 10% or from 0.01 to 5%, as measured by ASTM D1003.

In certain embodiments of the disclosure, the composite layer can have a thickness in the range from 5 to 400 nm, or from 5 to less than 300 nm, and the substrate can have a thickness in the range from 25 and 500 µm, wherein the biosensor component has a visible light transmission of no more than 20%.

In certain embodiments, the composite layer has a thickness in the range from 5 to 400 nm, or 5 to 200 nm, or 5 to 100 nm, or 5 to 80 nm.

In one aspect, certain embodiments of the present disclosure relate to a biosensor component comprising a substrate, and a composite layer deposited on the substrate, wherein the composite layer comprises a conductive metal component and a resistive material component, wherein the conductive metal component comprises at least one non-noble metal and the resistive material component comprises at least one resistive material, wherein the resistive material can comprise carbon, the conductive metal component can comprise one or more non-noble metal elements according to any of the various aspects discussed above, and the substrate can be comprised of at least one of any polymer described in the art and/or described herein including but not limited to polycarbonate, silicone polymers, acrylics, PET, modified PET such as PETG or PCTG, PCT, PCTA, polyesters comprising TMCD AND CHDM, PCCD, or PEN, by any means known in the art, including but not limited to, physical vapor deposition. The composite layer can have a thickness in the range of 5 to 400 nm, or 5 to less than 200 nm, and the substrate can have a thickness of between 25 and 500 µm, such that the biosensor component has a visible light transmission of no more than 20% or no more than 15% or no more than 10% or no more than 5%.

One or more embodiments of the present disclosure can relate to an electrode for a biosensor, with the electrode comprising a substrate, and a composite layer deposited on the substrate. In certain embodiments, the composite layer is a combination of carbon and chromium, and the composite layer can have an oxidation wave voltage for $Fe(II)[CN]_6$ mediator (identified below as $E_{peak,anodic}$) of less than 450, or less than 400, or less than 375, or less than 350, or less than 325, or less than 300, or less than 275 millivolts (mV), as determined in a Type 1 Linear Sweep Voltammetry Test (as discussed in the Examples section).

The substrate can be comprised of any polymer composition known in the art including but not limited to at least one polymer selected from the groups consisting of: nylon, polyesters, copolyesters, polyethylene, polypropylene, polyamides; polystyrene, polystyrene copolymers, styrene acrylonitrile copolymers, acrylonitrile butadiene styrene copolymers, poly(methylmethacrylate), acrylic copolymers, poly (ether-imides); polyphenylene oxides or poly(phenylene oxide)/polystyrene blends, polystyrene resins; polyphenylene sulfides; polyphenylene sulfide/sulfones; poly(estercarbonates); polycarbonates; polysulfones; polysulfone ethers; and poly(ether-ketones); or mixtures of any of the other foregoing polymers.

In one embodiment, the substrate can be comprised of at least one polyester comprising residues of at least one glycol selected from the group consisting of ethylene glycol, 1,4-cyclohexanedimethanol, and 2,2,4,4-tetramethyl-1,3-cyclobutanediol.

In one embodiment, the substrate can be comprised of at least one polyester comprising residues of terephthalic acid and/or dimethyl terephthalate and residues of at least one glycol selected from the group consisting of ethylene glycol, 1,4-cyclohexanedimethanol, and 2,2,4,4-tetramethyl-1,3-cyclobutanediol.

One or more embodiments of the present disclosure concern a method for forming an electrode for a biosensor. The method comprises (a) providing a substrate; (b) providing a composite layer target that comprises a conductive metal component and a resistive material component; (c) physical vapor depositing at least a portion of said substrate with material from said composite layer target to thereby form a composite layer on said substrate having a composite layer surface facing opposite the substrate. The conductive metal component can comprise one or more non-noble metal elements. In one embodiment, the conductive metal component can comprise chromium. In another embodiment, the conductive metal component can comprise nickel and chromium. In yet another embodiment, conductive metal component can comprise nickel and chromium wherein the combined weight percent of the nickel and chromium in the conductive metal component can be at least 50, or at least 60, or at least 70, or at least 80, or at least 90, or at least 95 weight percent. In certain embodiments, the resistive material component can comprise carbon and the composite layer can have a thickness in the range from 5 to 400 nm, or 5 to 200 nm. In certain embodiments, the conductive material component can comprise any of the metals or combinations of metals described herein for the various aspects of the invention, the resistive material component can comprise amorphous carbon, and the composite layer can have a thickness in the range from 5 to 400 nm. Additionally, the composite layer can have a sheet resistance of less than 2000 ohms per square.

One or more embodiments of the present disclosure concern a method for forming an electrode for a biosensor. The composite layer can have a sheet resistance, as measured by ASTM F1711-96, of no more than 5000, 2000, 100, 80, 60, 50, 40, 20, 10, or 5 ohms per square. In some embodiments, the layer can have a sheet resistance of between 1 to 5000 ohms per square, 1 to 4000 ohms per square, 1 to 3000 ohms per square, 1 to 2000 ohms per square, 1 to 1000 ohms per square, 1 to 500 ohms per square, 5 to 100 ohms per square, 5 to 20 ohms per square, 5 to 15 ohms per square, 5 to 10 ohms per square, 10 to 80 ohms per square, 20 to 60 ohms per square, or 40 to 50 ohms per square, as measured by ASTM F1711-96. The layer can have a sheet resistance of less than 2000 ohms per square.

While most of this disclosure relates to electrodes used as biosensor components, it is contemplated that the electrodes can be used in other end-use applications as well. As a result, any disclosure herein related to electrodes used in biosensors is intended to incorporate herein applicability to all electrodes that this technology could reasonably be applied to by one of ordinary skill in the art.

BRIEF DESCRIPTION OF THE FIGURES

Embodiments of the present disclosure are described herein with reference to the following figures, wherein.

DETAILED DESCRIPTION

Figure 1:
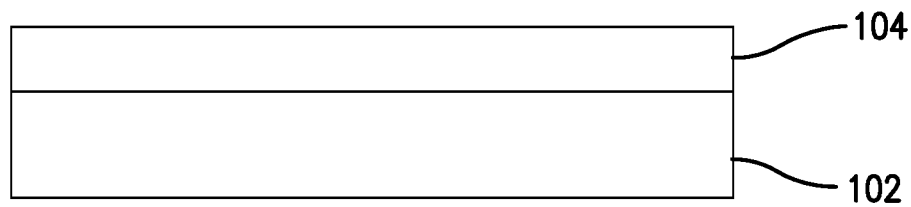
FIG. 1 is a sectional schematic illustration of a thin-film electrode biosensor component of embodiments of the present disclosure.
Figure 2:
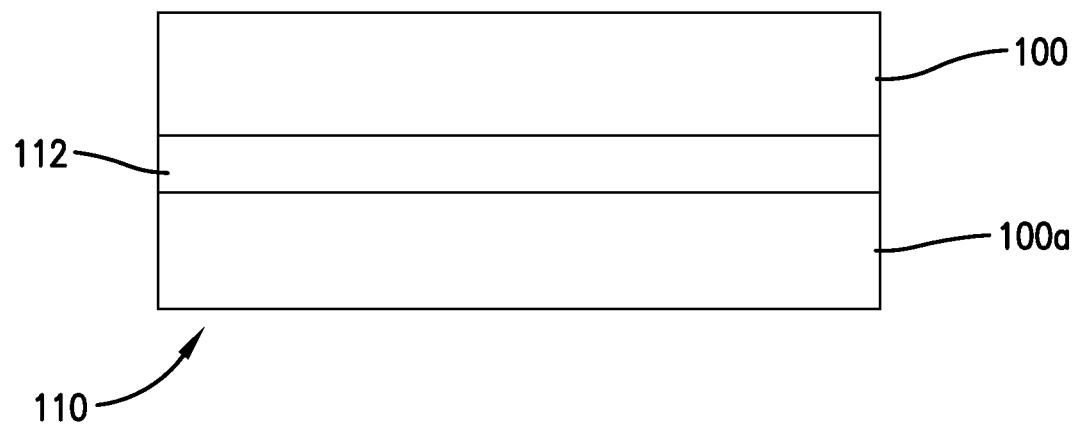
FIG. 2 is a schematic illustration of a test-strip biosensor component of embodiments of the present disclosure.

The present invention is generally directed to a component for an electrode such as those used in a biosensor. As used herein, the term "biosensor" shall denote a device for analyzing biological samples. In some embodiments, as illustrated in FIG. 1, the biosensor component may be a layered thin-film electrode 100 and may broadly comprise a substrate 102, and a composite layer 104 deposited on at least a portion of the substrate 102, where the composite layer is a composite of a conductive metal component and a resistive material component. In some embodiments, the biosensor may be a medical sensor, such as a glucose measuring system, and the biosensor component may be a test-strip for use with the biosensor. As used herein, the term "medical sensor" shall denote a biosensor used for medical monitoring and/or diagnosis. For instance, as illustrated in FIG. 2, some embodiments contemplate that the biosensor component will comprise a test-strip 110 that includes a first electrode 100 separated from a second electrode 100a by a reaction space 112. The first electrode 100 may comprise a working electrode and the second electrode 100a may comprise a reference electrode or a counter electrode or a combined reference and counter electrode. As such, a biological sample, such as a drop of blood, can be placed within the reaction space 112 and in electrical contact with the first and second electrodes 100 and 100a for analysis. It should be understood that FIG. 2 is not intended to be limiting and shows one possible embodiment for a test strip. Other embodiments for test strips can include different configurations for the electrode(s), such as, for example, a co-planar electrode configuration. As used herein, the term "blood glucose sensor" shall denote a medical sensor used to determine a concentration of glucose in blood. In addition, a bio-reactant that reacts with the biological sample, e.g., a protein, an enzyme (e.g., glucose oxidase, glucose dehydrogenase, or the like), and a mediator (e.g., ferricyanide, ruthenium complexes, osmium complexes, quinones, phenothiazines, phenoxazines, or the like) can be formed on one or both electrodes, e.g., the working electrode.

Unlike conventional physical vapor deposited biosensor components, which normally include and/or use noble metals such as palladium and/or gold, the biosensor components described herein can be formed from non-noble metals or alloys, such as those including chromium, or an alloy of nickel and chromium. Nevertheless, biosensor components, such as thin-film electrodes, formed from the non-noble metal or alloys in a composite with a resistive material, as described herein, can exhibit superior consistency and accuracy when measuring biological samples. Thus, by using biosensor components comprised of a composite of the non-noble metal or alloys and a resistive material, as described herein, the material and manufacturing costs typically associated with the fabrication and use of biosensor components can be significantly reduced.

Embodiments of the present disclosure provide for the substrate 102 to be formed from any type of material, either flexible or rigid, which is generally non-conductive and chemically inert to the contemplated chemical reactions described herein. In certain embodiments, the substrate 102 of the biosensor component may comprise a flexible, non-conductive film, including polymers, such as a polymeric film, a polyester film, a polycarbonate film, or the like. In certain specific embodiments, the substrate 102 may comprise a polyethylene terephthalate (PET) film. Embodiments of the present disclosure contemplate that the substrate 102 may have a thickness of at least 25 μm, 125 μm, or 250 μm, and/or not more than 800 μm, 500 μm, or 400 μm. In certain embodiments, the substrate 102 may have a thickness of between 25 to 800 μm, 25 to 500 μm, or 25 to 400 μm, between 125 to 800 μm, 125 to 500 μm, or 125 to 400 μm, or between 250 to 800 μm, 250 to 500 μm, or 250 to 400 μm.

The composite layer 104 coated on the substrate 102 may comprise one or more non-noble metals and one or more resistive materials. Such composite layer 104 may be coated on the substrate 102 via one or more physical vapor deposition techniques, such as sputter coating (e.g., magnetron sputtering, unbalanced magnetron sputtering, facing targets sputtering, or the like), thermal evaporation, electron beam evaporation, laser ablation, arc vaporization, co-evaporation, ion plating, or the like. The composite layer 104 may be coated on the substrate 102 to a thickness of at least 1, 10, 15, or 30 nm, and/or not more than 1000, 400, 200, 100, or 50, nm. In certain embodiments, the composite layer 104 may have a thickness of between 1 to 1000 nm, 1 to 400 nm, 1 to 200 nm, 1 to 100 nm, or 1 to 50 nm, between 10 to 1000 nm, 10 to 400 nm, 10 to 200 nm, 10 to 100 nm, or 10 to 50 nm, between 15 to 1000 nm, 15 to 400 nm, 15 to 200 nm, 15 to 100 nm, or 15 to 50 nm, or between 30 to 1000 nm, 30 to 400 nm, 30 to 200 nm, 30 to 100 nm, or 30 to 50 nm.

The composite layer 104 may be deposited on the substrate 102, such that the resulting thin-film electrode 100 will generally be opaque to visible light. For example, the resulting thin-film electrode 100 may have a visible light transmission, as measured by ASTM D1003, of no more than 50%, no more than 40%, no more than 30%, or no more than 20%. In certain embodiments, the resulting thin-film electrode 100 may have a visible light transmission of between 1 to 50%, between 10 to 40%, between 15 to 30%, or about 20%. Additionally, the resulting thin-film electrode 100 may have a sheet resistance, as measured by ASTM F1711-96, of no more than 5000, 2000, 100, 80, 60, 50, 40, 20, 10, or 5 ohms per square. In some embodiments, the resulting thin-film electrode 100 may have a sheet resistance of between 1 to 5000 ohms per square, 2 to 2000 ohms per square, 5 to 100 ohms per square, 10 to 80 ohms per square, 20 to 60 ohms per square, or 40 to 50 ohms per square.

In embodiments of the invention, the composite layer is formed from a composite that comprises one or more metals (e.g., non-noble metals) and one or more resistive materials. By the term "composite" it is meant a material comprised of different elements in the form of a matrix of distinct components that are incorporated or intermixed within the matrix. The matrix may be a homogenous arrangement of the different components or may contain regions of relatively higher concentrations of one component compared to the other component(s). In embodiments of this invention, the composite layer comprises a conductive metal component and a resistive material component. In one embodiment, the composite layer is in the form of a homogenous matrix of the conductive metal component and the resistive material component. In embodiments, the composite layer comprises species of combined elements of conductive metal and resistive material, e.g., a chemically reacted combined species, such a CrC or NiC. In embodiments, the composite layer comprises species of combined elements of conductive metal and resistive material, along with a conductive metal component and/or a resistive material component.

In embodiments of a first aspect of the invention, non-noble metals described herein, which form the conductive metal component of the composite layer 104, may be comprised of metals or alloys chosen from one or more of Ni, Cr, Mo, Mn, Cu, Ti, Co, Al, Fe, W, S, P, V, Nb, Zr, or combinations of two or more thereof. In certain embodiments, the non-noble metals may be comprised of Cr, Ni, or an alloy of Cr and Ni. In one embodiment, the conductive metal component comprises Cr. In one embodiment, the conductive metal component is Cr.

In embodiments of the first aspect of the invention, the conductive metal component comprises alloys of nickel and chromium. For example, non-noble metal alloys comprised of at least 5 weight percent nickel and at least 5 weight percent Cr can be contained in the composite layer 104 of a biosensor component. Various alloys containing nickel and chromium ranging from Ni:Cr (weight) ratio of 100:0 to 0:100 can be used for the conductive metal component to prepare electrodes comprising a composite layer of the conductive metal component and a resistive material component.

In certain embodiments of the first aspect, the amount of nickel and chromium included in the non-noble metal alloys that comprise the conductive component of the composite layer (for example, layer 104 of the biosensor component) can vary depending on the specific requirements of the electrode, for example, the biosensor component. In various embodiments of the second aspect, the non-noble metal alloys can comprise at least about 5 to about 95 weight percent of nickel. Additionally, in various embodiments, the non-noble metal alloys can comprise at least about 5, 10, 20, greater than 20, 25, 30, 40, 50, or greater than 50, 60 and/or up to about 95, 90, 80, 70, 60, greater than 50, 50, or 40 weight percent of chromium. More particularly, in embodiments, the non-noble metal alloys can comprise in the range of about 5 to 95, 10 to 90, 10 to 80, 10 to 70, 10 to 60, 10 to 50, 10 to 40, 20 to 90, 20 to 80, 20 to 70, 20 to 60, 20 to 50, 20 to 40, greater than 20 to 90, greater than 20 to 80, greater than 20 to 70, greater than 20 to 60, greater than 20 to 50, greater than 20 to 40, 25 to 90, 25 to 80, 25 to 70, 25 to 60, 25 to 50, 25 to 40, 30 to 90, 30 to 80, 30 to 70, 30 to 60, 30 to 50, 30 to 40, 40 to 90, 40 to 80, 40 to 70, 40 to 60, 40 to 50, 50 to 90, 50 to 80, 50 to 70, 50 to 60, greater than 50 to 95, greater than 50 to 90, greater than 50 to 80, greater than 50 to 70, greater than 50 to 60, 60 to 95, 60 to 90, 60 to 80, 60 to 70, 70 to 95, 70 to 90, 70 to 80, 80 to 95, or 80 to 90 weight percent of chromium. In one embodiment, in addition to the amount of chromium as specified above, the balance of the alloy is nickel. It should be understood that alloys containing nickel and chromium in a combined amount of 100 weight percent of the alloy, the alloy can still contain a small amount of other element(s) as impurities.

In certain embodiments, the amount of nickel and chromium included in the non-noble metal alloys that comprise the conductive metal component in the composite layer of the electrode, for example, the biosensor component, can vary depending on the specific requirements of the biosensor component as follows: 10 to 95 weight % chromium and 5 to 90 weight % nickel; 10 to 90 weight % chromium and 10 to 90 weight % nickel; or 10 to 80 weight % chromium and 20 to 90 weight % nickel; or 10 to 70 weight % chromium and 30 to 90 weight % nickel; or 10 to 60 weight % chromium and 40 to 90 weight % nickel; or 10 to 50 weight % chromium and 50 to 90 weight % nickel, or 10 to 40 weight % chromium and 60 to 90 weight % nickel; or 20 to 90 weight % chromium and 10 to 80 weight % nickel; or 20 to 80 weight % chromium and 20 to 80 weight % nickel; or 20 to 70 weight % chromium and 30 to 80 weight % nickel; or 20 to 60 weight % chromium and 40 to 80 weight % nickel; or 20 to 50 weight % chromium and 50 to 80 weight % nickel; or 20 to 40 weight % chromium and 60 to 80 weight % nickel; or greater than 20 to 90 weight % chromium and 10 to less than 80 weight % nickel; or greater than 20 to 80 weight % chromium and 20 to less than 80 weight % nickel; or greater than 20 to 70 weight % chromium and 30 to less than 80 weight % nickel; or greater than 20 to 60 weight % chromium and 40 to less than 80 weight % nickel; or greater than 20 to 50 weight % chromium and 50 to less than 80 weight % nickel; or greater than 20 to 40 weight % chromium and 60 to less than 80 weight % nickel; or 25 to 90 weight % chromium and 10 to 75 weight % nickel; or 25 to 80 weight % chromium and 20 to 75 weight % nickel; or 25 to 70 weight % chromium and 30 to 75 weight % nickel; or 25 to 60 weight % chromium and 40 to 75 weight % nickel; or 25 to 50 weight % chromium and 50 to 75 weight % nickel; or 25 to 40 weight % chromium and 60 to 75 weight % nickel; or 30 to 90 weight % chromium and 10 to 70 weight % nickel; or 30 to 80 weight % chromium and 20 to 70 weight % nickel; or 30 to 70 weight % chromium and 30 to 70 weight % nickel; or 30 to 60 weight % chromium and 40 to 70 weight % nickel; or 30 to 50 weight % chromium and 50 to 70 weight % nickel; or 30 to 40 weight % chromium and 60 to 70 weight % nickel; or 40 to 90 weight % chromium and 10 to 60 weight % nickel; or 40 to 80 weight % chromium and 20 to 60 weight % nickel; or 40 to 70 weight % chromium and 30 to 60 weight % nickel; or 40 to 60 weight % chromium and 40 to 60 weight % nickel; or 40 to 50 weight % chromium and 50 to 60 weight % nickel; or 50 to 95 weight % chromium and 5 to 50 weight % nickel; 50 to 90 weight % chromium and 10 to 50 weight % nickel; or 50 to 80 weight % chromium and 20 to 50 weight % nickel; or 50 to 70 weight % chromium and 30 to 50 weight % nickel; or 50 to 60 weight % chromium and 40 to 50 weight % nickel; or greater than 50 to 95 weight % chromium and 5 to less than 50 weight % nickel; or greater than 50 to 90 weight % chromium and 10 to less than 50 weight % nickel; or greater than 50 to 80 weight % chromium and 20 to less than 50 weight % nickel; or greater than 50 to 70 weight % chromium and 30 to less than 50 weight % nickel; or greater than 50 to 60 weight % chromium and 40 to less than 50 weight % nickel; or 60 to 95 weight % chromium and 5 to 40 weight % nickel; or 60 to 90 weight % chromium and 10 to 40 weight % nickel; or 60 to 80 weight % chromium and 20 to 40 weight % nickel; or 60 to 70 weight % chromium and 30 to 40 weight % nickel; or 70 to 95 weight % chromium and 5 to 30 weight % nickel; or 70 to 90 weight % chromium and 10 to 30 weight % nickel; or 70 to 80 weight % chromium and 20 to 30 weight % nickel; or 80 to 95 weight % chromium and 5 to 20 weight % nickel; or 80 to 90 weight % chromium and 10 to 20 weight % nickel; all of these weight percentages being based on the total weight percentages of the conductive metal component equaling 100 weight percent.

In embodiments of the second aspect, the resistive material component comprises carbon, the weight percent of chromium in the conductive metal component is in the range from about 25 to about 95 weight percent, and the balance of the conductive metal component is essentially nickel.

In embodiments of the second aspect, the resistive material component comprises carbon, the weight percent of chromium in the conductive metal component is in the range from greater than 50 to about 95 weight percent, and the balance of the conductive metal component is essentially nickel.

In embodiments of the second aspect, the conductive metal component can comprise nickel and chromium wherein the combined weight percent of the nickel and chromium in the conductive metal component can be at least 50, or at least 60, or at least 70, or at least 80, or at least 90, or at least 95 weight percent, based on the total weight of the conductive metal component equaling 100 weight percent, and wherein the conductive metal component comprises greater than 20 weight percent chromium, based on the total weight of the conductive metal component equaling 100 weight percent. In embodiments of the second aspect, the substrate has a thickness between 25 and 500 μm, the composite layer has a thickness between 15 and 400 nm, or 15 to 200 nm.

In embodiments of the second aspect, the conductive metal component can comprise nickel in the range of less than 80 weight percent, or less than 75 weight percent, and chromium in the range of greater than 20, or greater than 25 weight percent, and wherein the total combined weight percent of the nickel and chromium in the conductive metal component is in the range of 90 to 100, or 95 to 100 weight percent, based on the total weight of the conductive metal component equaling 100 weight percent.

In embodiments of the second aspect, the weight percent of chromium in the conductive metal component is in the range from about 25 to about 95 weight percent, and the balance of the conductive metal component is essentially nickel. In other embodiments of the second aspect, the weight percent of chromium in the conductive metal component is in the range from about 30 to about 95 weight percent, and the balance of the conductive metal component is essentially nickel. In further embodiments of the second aspect, the weight percent of chromium in the conductive metal component is in the range from about 40 to about 95 weight percent, and the balance of the conductive metal component is essentially nickel. In yet other embodiments of the second aspect, the weight percent of chromium in the conductive metal component is in the range from about 50 to about 95 weight percent, and the balance of the conductive metal component is essentially nickel. In another embodiment of the second aspect, the weight percent of chromium in the conductive metal component is in the range from greater than 50 to about 95 weight percent, and the balance of the conductive metal component is essentially nickel.

In embodiments of the second aspect, the resistive material component is carbon. In an embodiment of the second aspect, the resistive material component is carbon, the weight percent of chromium in the conductive metal component is in the range from about 25 to about 95 weight percent, and the balance of the conductive metal component is essentially nickel. In another embodiment of the second aspect, the resistive material component is carbon, the weight percent of chromium in the conductive metal component is in the range from greater than 50 to about 95 weight percent, and the balance of the conductive metal component is essentially nickel.

In certain embodiments of the second aspect, the conductive metal component contains molybdenum, if present, in an amount of 0 to 2, or 0 to 1 weight percent, based on the total weight of the conductive metal component. In certain embodiments, the conductive metal component contains molybdenum, if present, in an amount less than 1, or less than 0.8, or less than 0.6, or less than 0.4, or less than 0.2, or less than 0.1 weight percent, based on the total weight of the conductive metal component. In embodiments, the conductive metal component (and consequently the composite layer) is substantially free of molybdenum. In embodiments, the conductive metal component (and composite layer) contains no molybdenum.

In certain embodiments of the second aspect, the conductive metal component contains less than 1.0, or less than 0.5, or less than 0.2 weight percent of each of the following element species: iron, carbon, sulfur, phosphorous, molybdenum, niobium, cobalt, aluminum, titanium, or boron. In an embodiment, the conductive metal component contains none, or is substantially free, of the following element species: carbon, sulfur, phosphorous, molybdenum, niobium, cobalt, aluminum, titanium, or boron. In certain embodiments, the conductive metal component comprises nickel and chromium and contains less than 1.0, or less than 0.5, or less than 0.2, or less than 0.1, or less than 0.05 weight percent of any other element species. In certain embodiments, the conductive metal component comprises nickel and chromium and contains less than 2.0, or less than 1.0, or less than 0.5, or less than 0.2, or less than 0.1, or less than 0.05 weight percent of a total of all other element species.

In certain embodiments of the second aspect, the amount of nickel and chromium included in the non-noble metal alloys that comprise the conductive metal component in the composite layer of the electrode, for example, the biosensor component, can vary depending on the specific requirements of the biosensor component as follows: 10 to 95 weight % chromium and 5 to 90 weight % nickel; 10 to 90 weight % chromium and 10 to 90 weight % nickel; or 10 to 80 weight % chromium and 20 to 90 weight % nickel; or 10 to 70 weight % chromium and 30 to 90 weight % nickel; or 10 to 60 weight % chromium and 40 to 90 weight % nickel; or 10 to 50 weight % chromium and 50 to 90 weight % nickel, or 10 to 40 weight % chromium and 60 to 90 weight % nickel; or 20 to 90 weight % chromium and 10 to 80 weight % nickel; or 20 to 80 weight % chromium and 20 to 80 weight % nickel; or 20 to 70 weight % chromium and 30 to 80 weight % nickel; or 20 to 60 weight % chromium and 40 to 80 weight % nickel; or 20 to 50 weight % chromium and 50 to 80 weight % nickel; or 20 to 40 weight % chromium and 60 to 80 weight % nickel; or greater than 20 to 90 weight % chromium and 10 to less than 80 weight % nickel; or greater than 20 to 80 weight % chromium and 20 to less than 80 weight % nickel; or greater than 20 to 70 weight % chromium and 30 to less than 80 weight % nickel; or greater than 20 to 60 weight % chromium and 40 to less than 80 weight % nickel; or greater than 20 to 50 weight % chromium and 50 to less than 80 weight % nickel; or greater than 20 to 40 weight % chromium and 60 to less than 80 weight % nickel; or 25 to 90 weight % chromium and 10 to 75 weight % nickel; or 25 to 80 weight % chromium and 20 to 75 weight % nickel; or 25 to 70 weight % chromium and 30 to 75 weight % nickel; or 25 to 60 weight % chromium and 40 to 75 weight % nickel; or 25 to 50 weight % chromium and 50 to 75 weight % nickel; or 25 to 40 weight % chromium and 60 to 75 weight % nickel; or 30 to 90 weight % chromium and 10 to 70 weight % nickel; or 30 to 80 weight % chromium and 20 to 70 weight % nickel; or 30 to 70 weight % chromium and 30 to 70 weight % nickel; or 30 to 60 weight % chromium and 40 to 70 weight % nickel; or 30 to 50 weight % chromium and 50 to 70 weight % nickel; or 30 to 40 weight % chromium and 60 to 70 weight % nickel; or 40 to 90 weight % chromium and 10 to 60 weight % nickel; or 40 to 80 weight % chromium and 20 to 60 weight % nickel; or 40 to 70 weight % chromium and 30 to 60 weight % nickel; or 40 to 60 weight % chromium and 40 to 60 weight % nickel; or 40 to 50 weight % chromium and 50 to 60 weight % nickel; or 50 to 95 weight % chromium and 5 to 50 weight % nickel; 50 to 90 weight % chromium and 10 to 50 weight % nickel; or 50 to 80 weight % chromium and 20 to 50 weight % nickel; or 50 to 70 weight % chromium and 30 to 50 weight % nickel; or 50 to 60 weight % chromium and 40 to 50 weight % nickel; or greater than 50 to 95 weight % chromium and 5 to less than 50 weight % nickel; or greater than 50 to 90 weight % chromium and 10 to less than 50 weight % nickel; or greater than 50 to 80 weight % chromium and 20 to less than 50 weight % nickel; or greater than 50 to 70 weight % chromium and 30 to less than 50 weight % nickel; or greater than 50 to 60 weight % chromium and 40 to less than 50 weight % nickel; or 60 to 95 weight % chromium and 5 to 40 weight % nickel; or 60 to 90 weight % chromium and 10 to 40 weight % nickel; or 60 to 80 weight % chromium and 20 to 40 weight % nickel; or 60 to 70 weight % chromium and 30 to 40 weight % nickel; or 70 to 95 weight % chromium and 5 to 30 weight % nickel; or 70 to 90 weight % chromium and 10 to 30 weight % nickel; or 70 to 80 weight % chromium and 20 to 30 weight % nickel; or 80 to 95 weight % chromium and 5 to 20 weight % nickel; or 80 to 90 weight % chromium and 10 to 20 weight % nickel; all of these weight percentages being based on the total weight percentages of the conductive metal component equaling 100 weight percent; and wherein the conductive metal component comprises nickel and chromium and contains less than 1.0, or less than 0.5, or less than 0.2 weight percent of any other element species, or is substantially free of any other element species, or contains no other element species.

In embodiments of a third aspect, the conductive metal component can comprise nickel and chromium wherein the nickel is present in an amount of at least 4, or 5, or 6, or 8 weight percent and the chromium is present in an amount of at least 10 weight percent, based on the weight of the conductive metal component.

In one embodiment of the third aspect, the conductive metal component can comprise nickel and chromium wherein the combined weight percent of the nickel and chromium in the conductive metal component can be in the range of 24, or 25, to less than 95 weight percent, at least 10 weight percent chromium, and at least 4, or 5, or 6, or 8 weight percent nickel, based on the total weight of the conductive metal component. In addition to nickel and chromium, in certain embodiments of the third aspect, the conductive metal component can also comprise iron wherein the iron is present in an amount greater than 2 weight percent, based on the total weight of the conductive metal component equaling 100 weight percent. In embodiments of the third aspect, the conductive metal component can comprise 0 to less than 20, or 0 to 17, or 0 to 13, or 0 to 10, or 0 to 9, or 0 to 8, or 0 to 7, or 0 to 6, or 0 to 5, or 0 to 4, or 0 to 3, or 0 to 2, or 0 to 1, or 0 to 0.5, or 0 to 0.1, weight percent molybdenum.

In a fourth aspect, the conductive metal component can comprise nickel and chromium wherein the combined weight percent of the nickel and chromium in the conductive metal component can be in the range of 24 to 95 weight percent, or 25 to 90 weight percent, or 26 to 89 weight percent, based on the total weight of the conductive metal component equaling 100 weight percent. In addition to nickel and chromium, the conductive metal component can also comprise iron wherein the weight percent of the iron in the conductive metal component can be in the range of greater than 5 weight percent to less than 75 weight percent, or about 6 to about 74 weight percent, based on the total weight of the conductive metal component equaling 100 weight percent.

In embodiments of the fourth aspect, the conductive metal component can comprise nickel in the range of greater than 7 weight percent and chromium in the range of greater than 13 to less than 21 weight percent and wherein the total combined weight percent of the nickel and chromium in the conductive metal component is in the range of 24 to 95 weight percent, or greater than 25 to less than 90 weight percent, or 26 to 89 weight percent, based on the total weight of the conductive metal component equaling 100 weight percent.

In further embodiments of the fourth aspect, the conductive metal component can comprise nickel in the range of 8 to 72 weight percent, chromium in the range of about 14 to about 20 weight percent, and iron in the range of about 6 to about 74 weight percent and wherein the total combined weight percent of the nickel and chromium in the conductive metal component is in the range of about 25 to about 90 weight percent, or 26 to 89 weight percent, based on the total weight of the conductive metal component equaling 100 weight percent.

In certain embodiments of the fourth aspect, the conductive metal component can comprise nickel in the range of 8 to 72 weight percent, chromium in the range of 14 to 20 weight percent, and iron in the range of 6 to 74 weight percent, based on the total weight of the conductive metal component equaling 100 weight percent.

In certain embodiments of the fourth aspect, the conductive metal component can comprise nickel in the range of 8 to 72 weight percent, chromium in the range of 14 to 20 weight percent, and iron in the range of 6 to 74 weight percent, based on the total weight of the conductive metal component equaling 100 weight percent, and wherein the conductive metal component does not include any other element species that is present in an amount greater than 2 weight percent, based on the total weight of the conductive metal component equaling 100 weight percent. In one embodiment, the conductive metal component further comprises manganese in the range of 0.01 to 2.0 weight percent, and does not include any other element species that is present in an amount greater than 1.0 weight percent, based on the total weight of the conductive metal component equaling 100 weight percent.

In certain embodiments of the fourth aspect, the conductive metal component can comprise nickel in the range of 8 to 72 weight percent, chromium in the range of 14 to 20 weight percent, and iron in the range of 6 to 74 weight percent, based on the total weight of the conductive metal component equaling 100 weight percent, and wherein the conductive metal component further comprises manganese in the range of 0.01 to 2.0 weight percent, silicon in the range of 0.01 to 1.0 weight percent, copper in the range of 0 to 0.5 weight percent, based on the total weight of the conductive metal component equaling 100 weight percent. In an embodiment, the conductive metal component contains less than 0.2 weight percent of each of the following element species: carbon, sulfur, phosphorous, molybdenum, niobium, cobalt, aluminum, titanium, or boron. In an embodiment, the conductive metal component contains none, or is substantially free, of the following element species: molybdenum, niobium, cobalt, aluminum, titanium, or boron. In an embodiment, the conductive metal component contains none of the following element species: molybdenum, niobium, cobalt, aluminum, titanium, or boron.

In a fifth aspect, the conductive metal component can comprise nickel and chromium wherein the combined weight percent of the nickel and chromium in the conductive metal component can be in the range of 80 to less than 95 weight percent, or 81 to 94 weight percent, or 82 to 94 weight percent, or 83 to 94 weight percent, or 85 to 94 weight percent, or 86 to 94 weight percent, based on the total weight of the conductive metal component equaling 100 weight percent. In addition to nickel and chromium, the conductive metal component can also comprise iron wherein the weight percent of the iron in the conductive metal component can be in the range of greater than 5 weight percent to less than 12 weight percent, or about 6 to about 11 weight percent, or 6 to 11 weight percent, or 6 to 10 weight percent, or 6 to 9 weight percent, or 7 to 10 weight percent, or 7 to 9 weight percent, or about 9 weight percent, based on the total weight of the conductive metal component equaling 100 weight percent.

In embodiments of the fifth aspect, the conductive metal component can comprise nickel in the range of greater than 70 weight percent and chromium in the range of greater than 13 to less than 20 weight percent and wherein the total combined weight percent of the nickel and chromium in the conductive metal component is in the range of greater than 80 to less than 95 weight percent, or 81 to 94 weight percent, or 82 to 94 weight percent, or 83 to 94 weight percent, or 85 to 94 weight percent, or 86 to 94 weight percent, based on the total weight of the conductive metal component equaling 100 weight percent.

In further embodiments of the fifth aspect, the conductive metal component can comprise nickel in the range of 70 to 81 weight percent, chromium in the range of about 14 to about 19 weight percent, and iron in the range of about 6 to about 11 weight percent and wherein the total combined weight percent of the nickel and chromium in the conductive metal component is in the range of about 84 to about 94 weight percent, or 85 to 94 weight percent, or 86 to 94 weight percent, based on the total weight of the conductive metal component equaling 100 weight percent.

In certain embodiments of the fifth aspect, the conductive metal component can comprise nickel in the range of 70 to 81 weight percent, chromium in the range of 14 to 17 weight percent, and iron in the range of 6 to 11 weight percent, based on the total weight of the conductive metal component equaling 100 weight percent.

In certain embodiments of the fifth aspect, the conductive metal component can comprise nickel in the range of 72 to 81 weight percent, chromium in the range of 14 to 17 weight percent, and iron in the range of 6 to 11, or 6 to 10, weight percent, based on the total weight of the conductive metal component equaling 100 weight percent, and wherein the conductive metal component does not include any other element species that is present in an amount greater than 1 weight percent, based on the total weight of the conductive metal component equaling 100 weight percent. In one embodiment, the conductive metal component further comprises manganese in the range of 0.01 to 1.0 weight percent, and does not include any other element species that is present in an amount greater than 0.5 weight percent, based on the total weight of the conductive metal component equaling 100 weight percent.

In certain embodiments of the fifth aspect, the conductive metal component can comprise nickel in the range of 72 to 81 weight percent, chromium in the range of 14 to 17 weight percent, and iron in the range of 6 to 11, or 6 to 10, weight percent, based on the total weight of the conductive metal component equaling 100 weight percent, and wherein the conductive metal component further comprises manganese in the range of 0.01 to 1.0 weight percent, copper in the range of 0.01 to 0.5 weight percent, and silicon in the range of 0.01 to 0.5 weight percent, based on the total weight of the conductive metal component equaling 100 weight percent. In an embodiment, the conductive metal component contains none or is substantially free of the following element species: molybdenum, niobium, cobalt, aluminum, titanium, phosphorus, or boron, or, if any species is present, such species is in an amount of less than 0.25 weight percent, or less than 0.2 weight percent, or less than 0.1 weight percent, or less than 0.05 weight percent, or trace amounts or less. In an embodiment, the conductive metal component contains none, or is substantially free, of the following element species: molybdenum, niobium, cobalt, aluminum, titanium, phosphorus, or boron.

In a sixth aspect, the conductive layer can comprise nickel and chromium wherein the combined weight percent of the nickel and chromium in the conductive layer can be in the range of 24, or 25, to 90 weight percent, or 26 to 89 weight percent, based on the total weight of the conductive layer equaling 100 weight percent. In addition to nickel and chromium, the conductive layer can also comprise iron wherein the weight percent of the iron in the conductive layer can be in the range of greater than 5 weight percent to less than 75 weight percent, or about 6 to about 74 weight percent, based on the total weight of the conductive layer equaling 100 weight percent.

In a seventh aspect, the conductive metal component can comprise nickel and chromium wherein the combined weight percent of the nickel and chromium in the conductive metal component can be in the range of 24 to 55 weight percent, or 25 to less than 33 weight percent, or 26 to 32 weight percent, or 25 to less than 32 weight percent, or 26 to 31 weight percent, or 26 to 30.5 weight percent, based on the total weight of the conductive metal component equaling 100 weight percent. In addition to nickel and chromium, the conductive metal component can also comprise iron wherein the weight percent of the iron in the conductive metal component can be in the range of at least 35 weight percent to less than 75 weight percent, or at least 61 weight percent to less than 75 weight percent, at least 65 weight percent to less than 75 weight percent, or greater than 65 weight percent to less than 75 weight percent, or about 66 to about 74 weight percent, or greater than 66 up to 74 weight percent, based on the total weight of the conductive metal component equaling 100 weight percent.

In embodiments of the seventh aspect, the conductive metal component can comprise nickel in the range of 7 to less than 12 weight percent and chromium in the range of greater than 16 to less than 22 weight percent and wherein the total combined weight percent of the nickel and chromium in the conductive metal component is in the range of 25 to less than 32 weight percent, or 26 to 31 weight percent, or 26 to 30.5 weight percent, based on the total weight of the conductive metal component equaling 100 weight percent.

In further embodiments of the seventh aspect, the conductive metal component can comprise nickel in the range of 8 to 11 weight percent, chromium in the range of about 18 to about 20 weight percent, and iron in the range of about 66 to about 74 weight percent and wherein the total combined weight percent of the nickel and chromium in the conductive metal component is in the range of about 26 to about 31 weight percent, or 26 to 30.5 weight percent, based on the total weight of the conductive metal component equaling 100 weight percent.

In certain embodiments of the seventh aspect, the conductive metal component can comprise nickel in the range of 8 to 10.5 weight percent, chromium in the range of 18 to 20 weight percent, and iron in the range of 66 to 74 weight percent, based on the total weight of the conductive metal component equaling 100 weight percent.

In certain embodiments of the seventh aspect, the conductive metal component can comprise nickel in the range of 8 to 10.5 weight percent, chromium in the range of 18 to 20 weight percent, and iron in the range of 66 to 74, weight percent, based on the total weight of the conductive metal component equaling 100 weight percent, and wherein the conductive metal component does not include any other element species that is present in an amount greater than 1 weight percent, based on the total weight of the conductive metal component equaling 100 weight percent. In one embodiment, the conductive metal component further comprises manganese in the range of 0.01 to 1.0 weight percent and silicon in the range of 0.01 to 1.0 weight percent, and does not include any other element species that is present in an amount greater than 0.2, or 0.1, weight percent, based on the total weight of the conductive metal component equaling 100 weight percent.

In certain embodiments of the seventh aspect, the conductive metal component can comprise nickel in the range of 8 to 10.5 weight percent, chromium in the range of 18 to 20 weight percent, and iron in the range of 66 to 74, weight percent, based on the total weight of the conductive metal component equaling 100 weight percent, and wherein the conductive metal component further comprises manganese in the range of 0.01 to 1.0 weight percent, silicon in the range of 0.01 to 1.0 weight percent, and further comprises carbon, sulfur and phosphorous each in an amount less than 0.1 weight percent, based on the total weight of the conductive metal component equaling 100 weight percent. In an embodiment, the conductive metal component contains none or is substantially free of the following element species: molybdenum, niobium, cobalt, aluminum, titanium, copper or boron, or, if any species is present, such species is in an amount of less than 0.25 weight percent, or less than 0.2 weight percent, or less than 0.1 weight percent, or less than 0.05 weight percent, or trace amounts or less. In an embodiment, the conductive metal component contains none, or is substantially free, of the following element species: molybdenum, niobium, cobalt, aluminum, titanium, copper or boron.

In embodiments of the eighth aspect, the conductive layer can comprise nickel in the range of 10 to 30 weight percent, or greater than 10 and less than 30 weight percent, or 11 to 29 weight percent; chromium in the range of 17 to 26 weight percent, or greater than 17 to less than 26 weight percent, or 18 to 25 weight percent; molybdenum in the range of 2 to 8 weight percent, or greater than 2 and less than 8 weight percent, or 2.5 to 7 weight percent; and iron in the range of 35 to 75 weight percent, or 40 to 74 weight percent, or 41 to 70 weight percent, based on the total weight of the conductive layer equaling 100 weight percent.

In certain embodiments of the eighth aspect, the conductive metal component does not include any other element species that is present in an amount greater than 2 weight percent, based on the total weight of the conductive metal component equaling 100 weight percent.

In certain embodiments of the eighth aspect, the conductive metal component further comprises manganese in the range of 0.01 to 2.0 weight percent, silicon in the range of 0.01 to 1.0 weight percent, and further comprises carbon, sulfur and phosphorous each in an amount less than 0.1 weight percent, based on the total weight of the conductive metal component equaling 100 weight percent. In certain embodiments, the conductive metal component does not include any other element species that is present in an amount greater than 0.1, or greater than 0.05, or greater than 0.025 weight percent, based on the total weight of the conductive metal component equaling 100 weight percent.

In various embodiments of the invention, the composite layer comprises a conductive metal component and a resistive material component, wherein the resistive material component is present in an amount of at least 20, or at least 30, or at least 40, or at least 50, or greater than 50, or at least 60, or at least 65, or at least 70 at %, based on the total elements present in composite layer. In embodiments, the composite layer comprises a conductive metal component, a resistive material component, and a combined metal and resistive material species component, wherein the total amount of resistive material and combined metal and resistive species material, is present in an amount of at least 20, or at least 30, or at least 40, or at least 50, or greater than 50, or at least 60, or at least 65, or at least 70 at %, based on the total elements present in composite layer.

In various embodiments of the invention, the composite layer comprises a conductive metal component and a resistive material component, wherein the conductive metal component is chosen from any of the metals or alloys described above in the various aspects of the invention, wherein the resistive material component is carbon, and wherein the carbon is present in an amount of at least 20, or at least 30, or at least 40, or at least 50, or greater than 50, or at least 60, or at least 65, or at least 70 at %, based on the total elements present in composite layer. It should be understood that the conductive metal component may be a metal alloy that contains small amounts of carbon, that is in addition to the carbon in the resistive material component. For example, a sputtering source may be a composite material source made from a metal alloy (that contains some amount of carbon) and carbon separately added (to that alloy) to make the composite source, or the composite layer may be co-sputtered from a metal alloy source (that contains some amount of carbon) and a separate carbon source.

The composite layer in the present disclosure can be constructed of a single layer comprising any of the composite compositions disclosed in this application. In certain embodiments, the composite composition contains the metal or metal alloy, and the resistive material, e.g., C, in the form of a solid solution of the elements (a single phase), a mixture of metallic and resistive material element phases (two or more solutions) or an intermetallic/resistive material compound with no distinct boundary between the phases. In embodiments, the composite layer can comprise species of combined elements of metallic and resistive material, e.g., a chemically reacted combined species, such a CrC or NiC.

As one skilled in the art would readily appreciate, the elements of the non-noble metal or metal alloys, as well as the resistive material, may comprise incidental impurities. As used herein, "incidental impurities" refer to any impurities that naturally occur in the ore used to the produce the non-noble metal alloys or source of resistive material, or that are inadvertently added during the production process. The non-noble metal or metal alloys, and the resistive material, can each comprise less than about 0.1, 0.05, or 0.001 weight percent of the incidental impurities.

The non-noble metal alloys described herein may also contain one or more additional alloying elements, which are in addition to the elements described above. However, in various embodiments, the non-noble metal alloys can be substantially free from such additional alloying elements. As used herein, the terms "practically free" and "substantially free" mean that the non-noble metal alloy comprises less than 0.001 weight percent of such additional alloying components. Furthermore, the terms "practically free" and "substantially free" may be used interchangeably.

In one embodiment, the substrate can be comprised of at least one polyester comprising an acid component which comprises residues of terephthalic acid and isophthalic acid and/or esters thereof such as dimethyl terephthalate, and at glycol component comprising residues of at least one glycol selected from the group consisting of ethylene glycol residues, 1,4-cyclohexanedimethanol residues, and 2,2,4,4-tetramethyl-1,3-cyclobutanediol.

In one embodiment, the substrate can be comprised of at least one polyester comprising terephthalic acid residues, or an ester thereof, or mixtures thereof, and 1,4-cyclohexanedimethanol residues.

In one embodiment, the substrate can be comprised of at least one polyester made from terephthalic acid residues, or an ester thereof, or mixtures thereof, and 1,4-cyclohexanedimethanol residues and/or 2,2,4,4-tetramethyl-1,3-cyclobutanediol residues.

In one embodiment, the substrate can be comprised of at least one polyester made from terephthalic acid residues, or an ester thereof, or mixtures thereof, 2,2,4,4-tetramethyl-1,3-cyclobutanediol residues, and 1,4-cyclohexanedimethanol residues.

In one embodiment, the substrate can be comprised of at least one polyester made from terephthalic acid residues, or an ester thereof, or mixtures thereof, 2,2,4,4-tetramethyl-1,3-cyclobutanediol residues, and ethylene glycol residues.

In one embodiment, the substrate can be comprised of at least one polyester comprising terephthalic acid residues, or an ester thereof, or mixtures thereof, ethylene glycol residues, and 1,4-cyclohexanedimethanol residues.

In certain embodiments of the present disclosure, the biosensor components described herein can be prepared by performing the following steps:
(a) providing a substrate;
(b) providing a composite layer target;
(c) physical vapor depositing at least a portion of the substrate with material from the target to thereby form a composite layer on the substrate.

The providing a substrate of step (a) may include the provision of any type of substrate material, such as PET, as was previously described. In certain embodiments, the substrate will comprise a sheet of substrate material that can be actuated within a high vacuum chamber. The sheet of substrate material may comprise a single section of material, such as a square sheet. In some other embodiments, sheet of substrate material may comprise a roll of material that is passed, via a roll-to-roll mechanism, through the high vacuum chamber, as will be described in more detail below. In other embodiments, the substrate may be held stationary or may be rotated during deposition, as will be also described below.

The providing a target of step (b) may include the provision of a physical vapor deposition target comprised of any of the non-noble metals or metal alloys and the resistive materials previously described. For example, in some embodiments, the physical vapor deposition targets comprising the alloys of nickel and chromium, as discussed herein, can be combined with carbon to provide a composite target that can be used to make thin film composite layers. Such composite targets may comprise less than about 0.1, 0.05, or 0.001 weight percent of incidental impurities. In some embodiments, the physical vapor deposition target will be housed within and/or will comprise an electrode, such as a sputter cathode, during the physical vapor deposition process. In certain embodiments, the physical vapor deposition target may be circular, having a diameter of at least 2, 4, 8, 12, 16, or 20 cm. In other embodiments, the physical vapor deposition target may be a tubular target having an inner diameter of at least 2, 4, 8, or 16 cm and an outer diameter of 20, 24, 28 or 32 cm. In still other embodiments, the physical vapor deposition target may be rectangular with dimensions of: a width of between 5 to 25 cm, a length of between 25 to 75 cm, and a thickness of between 0.3 to 5 cm. It should be understood, however, that embodiments of the present disclosure contemplate the use of other-shaped and sized targets.

The physical vapor depositing of step (c) generally includes the coating of the substrate with the material from the non-noble metal and resistive material composite target to form the composite layer. As used herein, the term "physical vapor deposition" shall denote depositing thin-films by providing for the condensation of vaporized material onto a substrate. The physical vapor deposited coating may be performed with any type of physical vapor deposition process previously described, i.e., sputter coating, thermal evaporation, electron beam evaporation, laser ablation, arc vaporization, co-evaporation, ion plating, or the like. For example, in some embodiments, the physical vapor depositing step will be performed via a sputtering process, in which the substrate is coated with the composite layer by sputtering the non-noble metal and resistive material composite target via the sputtering device. Specific examples of such a sputtering-type physical vapor depositing will be described in more detail below. The resulting substrate with the composite layer coated thereon may be used as a biosensor component, such as an electrode. Such electrodes may include a working electrode, a reference electrode, and/or a counter electrode. In certain embodiments, such as when a roll of substrate material is vacuum coated with a composite layer, via a roll-to-roll physical vapor deposition process, the resulting thin-film sheet may be cut apart to appropriate size to form a thin-film electrode specifically sized for the biosensor component. In other embodiments, the biosensor components can be formed from the thin-film sheet by etching, such as chemical or laser etching. In still other embodiments, the biosensor components can be formed using a patterned mask, which is laid on the substrate, and the composite layer is physical vapor deposited thereover to form the composite layer of a biosensor component.

An alternative to step (b) can be to provide separate conductive metal and resistive material targets, where the conductive metal target can be comprised of any of the non-noble metals or metal alloys described herein, with respect to the conductive metal component of the composite layer, and where the resistive material target can be comprised of any of the resistive materials described herein, with respect to the resistive material component of the composite layer.

An alternative to step (c) can be coating of the substrate simultaneously with material from both the conductive metal target and the resistive material target, e.g., co-sputtering using both (conductive metal and resistive material) source targets, to form the composite layer.

In certain embodiments, such as when a roll of substrate material is vacuum coated with a composite layer, via a roll-to-roll physical vapor deposition process, the resulting thin-film sheet may be cut apart to appropriate size to form a thin-film electrode specifically sized for the biosensor component. Such electrodes may include a working electrode, a reference electrode, and/or a counter electrode. Electrodes may also include those for the detection of conductivity of a sample, whether or not a sample has been applied to the biosensor component, or other electrical characteristics of the sample or sample environment that is useful for a biosensor. In other embodiments, the biosensor components can be formed from the thin-film sheet by etching, such as chemical or laser etching. In still other embodiments, the biosensor components can be formed using a patterned mask, which is laid on the substrate, and the composite layer is physical vapor deposited thereover to form the biosensor component.

In certain specific embodiments, the biosensor components may be created via a roll-to-roll physical vapor deposition process that includes roll-to-roll magnetron sputtering. For instance, a substrate sheet comprising a polymer film made of PET (polyethylene terepthalate) with a thickness ranging from 25 μm to 250 μm and width of 33.02 cm may be sputtered using a 77.50 cm wide web roll-to-roll magnetron sputter coater, such as a the Smartweb coater offered by Applied Materials, Inc. or the Mark 80 offered by CHA Industries, Inc. A single or a dual target configuration can be employed to deposit a composite layer. A target comprised of a composite (e.g., of non-noble metal alloy and carbon) plate can be used. A vacuum chamber of the sputter coater can be pumped down to base pressure of at least $10^{-5}$ Torr using a diffusion and mechanical pump combination. In other embodiments, a combination of a mechanical pump, a turbo pump, a cryo pump, and/or an oil diffusion pump may be used. Magnetron sputtering cathodes housing the composite target(s) having a generally rectangular shape can be energized using 2 KW power supplies (such as offered from Advanced Energy Inc.). An argon gas flow into the vacuum chamber can be controlled (such as via a MKS model 1179A flow controller) to set a sputtering pressure between 3 to 10 mTorr for use during the sputtering process.

Thickness and sheet resistance of the sputtered composite layer can be efficiently controlled in-situ by controlling specific process parameters. Examples of process parameters include roll-to-roll web speeds (, i.e., controlling the speed of the substrate sheet as it travels through the vacuum chamber during sputtering), power supplied to the sputtering targets (i.e. a product of the applied voltage and current to the plasma formed near the target surface), gas pressure in the sputtering chamber, and the number of targets present in the chamber. For example, for sputtering of a composite layer of a given alloy, the web speed can be set to between 0.1 to 3.5 meters per minute and sputtering power density of from 1 to 8 Watts per square cm. In embodiments, sputtered composite layer may be formed having a measured thickness value of about 15 to 250 nm and a sheet resistance of about 8 to 4,000 ohms per square.

In addition to the roll-to-roll process described above, biosensor components can be manufacture using a scaled-up version of the same geometry, using a large-scale roll-to-roll process. In such a large-scale roll-to-roll process, maximum web speeds can be 0.1 to 10 meters per minute, between 3 to 7 meters per minute, or higher than 10 meters per minute. The large-scale roll-to-roll process may provide a sputtering power density between 0.1 to 13, 2 to 10, or 5 to 8 Watts per square cm. Additionally, the number of targets can include between 2, 4, 6 or more, and the web width of the substrate sheet can be from 75 cm or larger.

Embodiments additionally contemplate that physical vapor deposition processes can be utilized in which substrate sheets are held stationary within the vacuum chamber. Certain of such embodiments, are described in detail below in the Examples section. In some embodiments in which the substrate sheets are held stationary, deposition times for depositing the composite layer on the substrate sheets may be 5, 10, 15, 30 minutes or more.

As previously noted above, biosensor components that include a composite layer formed from the non-noble metals or alloys and a resistive material, as described herein, can exhibit desirable electrochemical properties that make them particularly well suited as replacements for biosensor components that incorporate noble metals, such as palladium and/or gold. For instance, the biosensor components of embodiments of the present disclosure may comprise a thin-film electrode formed with a composite layer that exhibits desirable dose-response characteristics when undergoing chronoamperometry tests.

In various embodiments, the composite layer can comprise chromium and carbon (in amounts as discussed herein) and the composite layer can have an oxidation wave voltage for Fe(II)[CN]$_6$ mediator (identified below as $E_{peak,anodic}$) of less than 400, or less than 390, or less than 380, or less than 375, or less than 360, or less than 350, or less than 340, or less than 330, or less than 325, or less than 320, or less than 310, or less than 300, or less than 290, or less than 280, or less than 275, or less than 270, or less than 260 millivolts (mV), as determined in a Type 1 Linear Sweep Voltammetry Test (as discussed in the Examples section).

This invention can be further illustrated by the following examples of embodiments thereof, although it will be understood that these examples are included merely for the purposes of illustration and are not intended to limit the scope of the invention unless otherwise specifically indicated.

EXAMPLES

Preparation of Thin-Film Electrodes

For each of the below-described examples (and comparative examples), biosensor components in the form of thin-film electrodes were formed by the following-described physical vapor deposition process. It is understood that thin-film electrodes can be formed, using the below process, to include a composite layer of a plurality of different types of elements and element alloys, such as the non-noble compositions listed in Table 1, along with a resistive material. In the example, thin film electrodes were prepared from chromium, molybdenum, and composites containing various ratios of chromium and carbon or various ratios of molybdenum and carbon, that was deposited on top of the substrate layer. The process included forming thin-film electrode films by:

(a) metal or metal/carbon composites were deposited on 10.16 cm×10.16 cm square PET substrate sheet using direct current ("DC") magnetron sputtering in a high vacuum chamber, with the sputtering having been performed with a Denton Vacuum Desktop Pro sputtering device;

(b) the vacuum chamber was evacuated to an initial base pressure of ~10$^{-5}$ Torr;

(c) argon gas of 10 sccm was introduced into the high vacuum chamber to create a deposition pressure of 2.8 mTorr;

(d) the substrate sheets were rotated at approximately two revolutions per minute within the vacuum chamber;

(e) a 5.08 cm diameter target of the metal or metal/carbon composite was held at a constant power of 40 Watts under the DC magnetron sputtering device for deposition time of 15 to 120 minutes to coat at least a portion of the substrate sheet with the metal or composite layer (to initialize the targets, the targets were held at a constant power of 40 Watts under the DC magnetron sputtering device for a 5 minute pre-sputtering time prior to the substrates being introduced into the vacuum chamber);

(f) all depositions were carried out at room temperature.

Individual thin-film electrodes, with a size of 5.08 cm×7.62 cm, were cut from the thin-film electrode films that were formed by physical vapor deposition, as provided above. Electrochemical experiments were conducted using a Gamry Instruments Reference 600 potentiostat in a three electrode configuration, with the electrochemical cell containing the thin-film electrode film positioned inside of a Gamry Instruments VistaShield Faraday Cage. Each of the thin-film electrodes was formed as a working electrode by partially masking the thin-film electrode with electroplating tape having a single 3 mm diameter aperture die-cut into it. As such, an unmasked portion formed by the die-cut aperture of the thin-film electrode provided a geometric working electrode surface area of 0.0707 square cm. Another different area of unmasked portion of the thin-film electrode served as an electrical connection point to a working electrode lead of the potentiostat. The masked portion of the thin-film electrode was placed onto a flat supporting block of non-conductive material, such as plastic. The thin-film electrode was thereafter placed into a working electrode port of a glass electrochemical cell. The exposed 3 mm diameter portion of the thin-film electrode was positioned near a center of a bottom opening of working electrode port of the electrochemical cell. The working electrode port of the electrochemical cell was sealed with a clamp and an O-ring. The electrochemical cell also contained a reference electrode comprising a saturated calomel reference electrode and a carbon auxiliary electrode. The reference electrode and the auxiliary electrode were placed, respectively in a reference electrode port and an auxiliary electrode port. Additionally, the reference electrode and the auxiliary electrode were connected, respectively, to a reference lead and an auxiliary lead of the potentiostat. The electrochemical cell also included a gas flow port by which to deaerate and blanket test solutions with inert gas, such as nitrogen.

Thin film electrodes were prepared from chromium, and chromium and carbon composites having Cr:C ratios (by atomic percent) of 100:0, 80:20, 70:30, 50:50, and 30:70 according to the procedures discussed above. Thin film electrodes were also prepared from molybdenum, molybdenum and carbon composites having Mo:C ratios (by atomic percent) of 100:0, 70:30, 50:50, and 30:70 according to the procedures discussed above. The conductive metal or composite layer thickness was approximately 15 to 250 nm as determined by TEM imaging of cross-sectioned electrodes.

Type 1 Linear Sweep Voltammetry Test Description

A Type 1 Linear Sweep Voltammetry Test can be used to test the electrochemical response of the thin-film electrodes. The Type 1 Linear Sweep Voltammetry Test comprises the following steps: 50 mL of 10 mM potassium phosphate buffer containing 145 mM sodium chloride at pH 7.1 was placed into the electrochemical cell and the electrochemical cell was sealed with stoppers. Gas inlet and outlet fittings, which were associated with the gas flow port, allowed inert gas sparging (i.e., de-aerating) of the buffer solution, via a gas flow of nitrogen, using a medium-porous filter stick. The gas flow port additionally allowed the gas flow to be switched from the filter stick to a headspace-blanketing arrangement. The gas outlet was connected to an oil bubbler to prevent back-diffusion of external gas (e.g., air) into the electrochemical cell. The buffer solution was stirred with a magnetic stirbar while simultaneously sparged with nitrogen for at least 5 minutes before switching the gas flow to a blanketing configuration. No agitation of the buffer solution from sparging or otherwise was otherwise present during the electrochemical experiments conducted via the Type 1 Linear Sweep Voltammetry Test (i.e., the solution was quiescent during electrochemical testing).

A linear sweep voltammetry test was performed on the thin-film electrode that comprised the working electrode within the electrochemical cell. The initial voltage potential for linear sweep voltammetry was 0 V versus the open circuit potential (also known as the rest potential), as measured between the working electrode and the reference electrode (i.e., the saturated calomel reference electrode), and after a rest period of at least 10 seconds prior to the voltammetric experiment, the voltage potential was swept anodically at 25 mV per second until a current of at least 50 µA was observed. For solutions that contained $Fe(II)[CN]_6$ mediator, the mediator was present at 1 mM concentration and the linear sweep voltammetry conditions were otherwise identical to mediator-free solutions.

Figure 3:
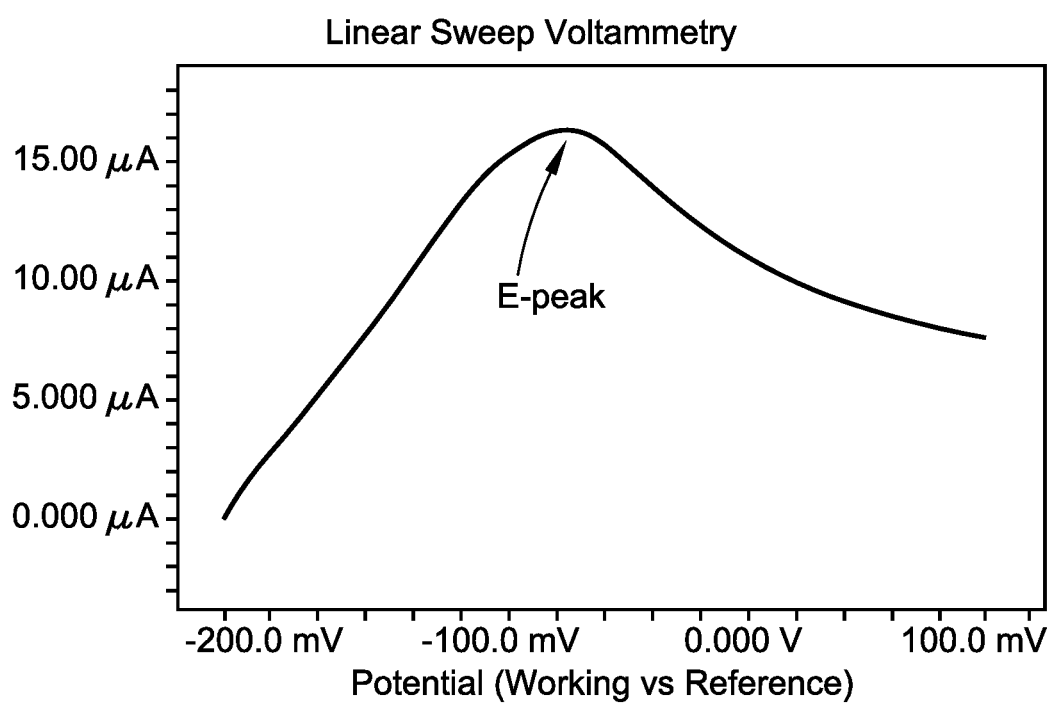
FIG. 3 is a graph depicting a linear sweep voltammogram plot of a thin-film electrode in a mediator-containing solution.

A peak voltage ("$E_{peak,anodic}$") of the oxidation wave is determined, with such $E_{peak,anodic}$ being defined as the voltage at which a local maximum of current is observed as a result of the oxidation of an electroactive species in solution, as measured between the working electrode and the counter electrode versus the reference electrode. An illustration of an oxidation wave and an associated $E_{peak,anodic}$, as obtained from a thin-film electrode using the Type 1 Linear Sweep Voltammetry Test, is illustrated in FIG. 3. As can be seen from FIG. 3, the measured $E_{peak,anodic}$ (or E-peak) value was approximately −76 mV, as measured versus a reference electrode.

Type 1 Cyclic Voltammetry Test Description

A Type 1 Cyclic Voltammetry Test can be used to test the electrochemical response of the thin-film electrodes. The Type 1 Cyclic Voltammetry Test comprises the following steps: 50 mL of 10 mM potassium phosphate buffer containing 145 mM sodium chloride at pH 7.1 was placed into the electrochemical cell and the electrochemical cell was sealed with stoppers. Gas inlet and outlet fittings, which were associated with the gas flow port, allowed inert gas sparging (i.e., de-aerating) of the buffer solution, via a gas flow of nitrogen, using a medium-porous filter stick. The gas flow port additionally allowed the gas flow to be switched from the filter stick to a headspace-blanketing arrangement. The gas outlet was connected to an oil bubbler to prevent back-diffusion of external gas (e.g., air) into the electrochemical cell. The solution was stirred with a magnetic stir bar while simultaneously sparged with nitrogen for at least 5 minutes before switching the gas flow to a blanketing configuration. No agitation of the buffer solution from sparging or otherwise was otherwise present during the electrochemical experiments conducted via the Type 1 Cyclic Voltammetry Test (i.e., the solution was quiescent during electrochemical testing).

A cyclic voltammetry was performed on the thin-film electrode that comprised the working electrode within the electrochemical cell. The initial voltage potential for linear sweep voltammetry was 0 V versus the open circuit potential (also known as the rest potential), as measured between the working electrode and the reference electrode (i.e., the saturated calomel reference electrode), and after a rest period of at least 10 seconds prior to the voltammetric experiment, the voltage potential was swept at a scan rate of 25 mV per second, cathodically first followed by an anodic potential sweep. For solutions that contained $Fe(II)[CN]6$ mediator, the mediator was present at 1 mM concentration and the linear sweep voltammetry conditions were otherwise identical to mediator-free solutions. For solutions that contained $[RuIII(NH3)6]Cl3$ mediator, the mediator was present at 1 or 2 mM concentration and the cyclic sweep voltammetry conditions were otherwise identical to mediator-free solutions.

Example 1—Application of Type 1 Linear Sweep Voltammetry Test to Thin-Film Electrodes A plurality of different thin-film electrodes were tested using the Type 1 Linear Sweep Voltammetry Test. In more detail, thin-film electrodes formed with Cr:C 100:0 (or pure Cr), Cr:C 80:20, Cr:C 70:30, Cr:C 50:50, and Cr:C 30:70, were tested.

Figure 4:
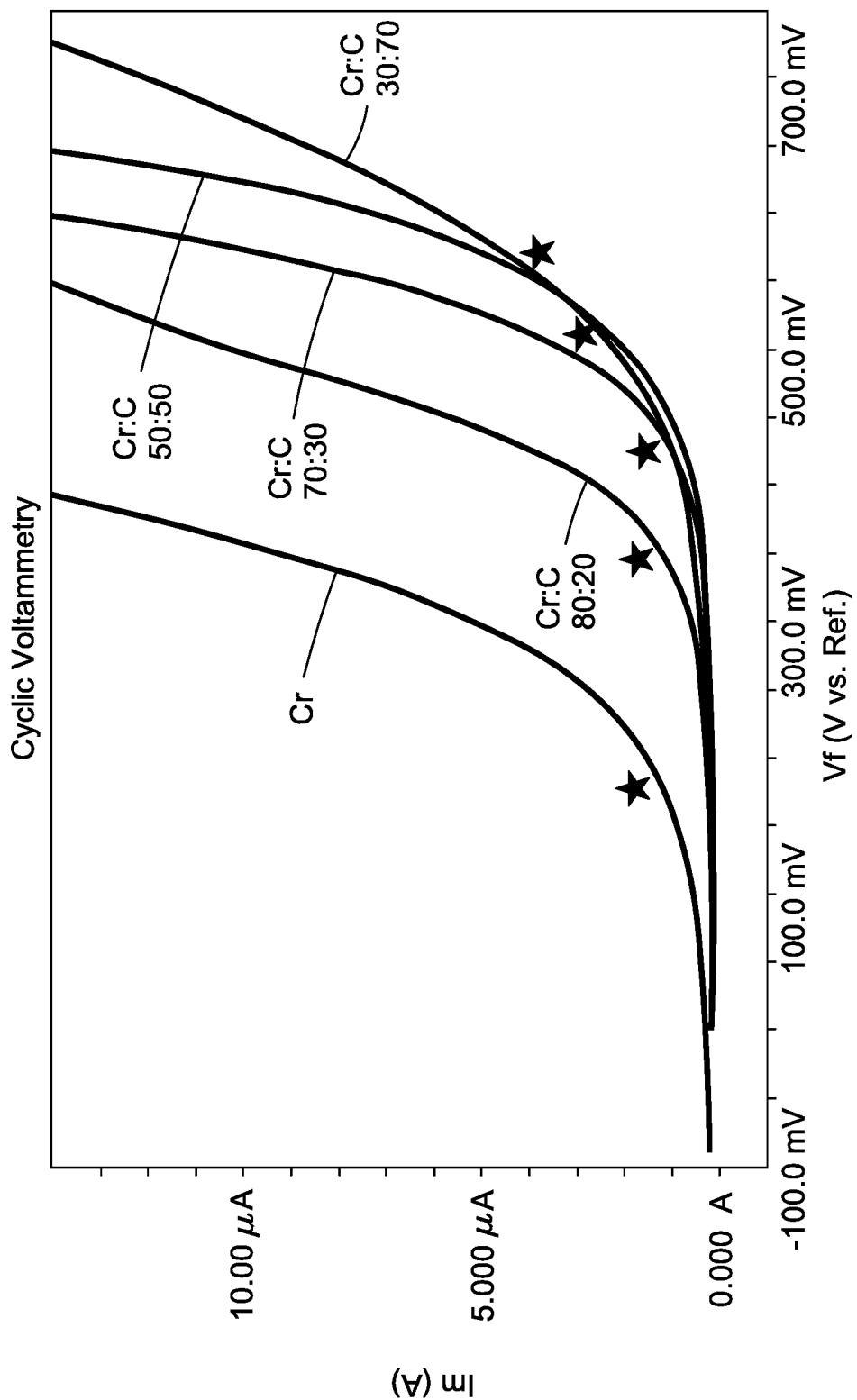
FIG. 4 is a graph depicting a linear sweep voltammogram plot of thin-film electrodes comparing various Cr and CrC composite films in buffer solutions.

The results of such tests for the Cr and C composite ranging from 100 at % Cr to 30 at % Cr are illustrated graphically in FIG. 4. It can be generally desirable for the thin-film electrodes used in biosensors to exhibit a peak anodic current for $Fe(II)[CN]_6$ that occurs at a voltage as low as possible. It can also generally be desirable for the thin-film electrodes used in biosensors to exhibit minimized and/or reduced currents under the influence of certain electrode potentials. FIG. 4 is a plot of a Type 1 linear sweep voltammetry test conducted on the Cr, and Cr and C composite, films using a mediator-free phosphate buffer solution and illustrates the background current or anodic stability of the films as a function of carbon content. As illustrated in FIG. 4, the thin-film electrodes show that anodic breakdown continues to improve as the carbon content increases. A review of FIG. 4 reveals that increasing carbon content of the composites tested from 20 to 70 at % leads to greater anodic stability. It can generally be a desirable characteristic of an electrode film to have sufficient anodic stability so that oxidation of the electrode itself is not a significant contributor to the current measured by the glucose meter, which (oxidation of the electrode) would lead to positive bias and lessened accuracy of the reported glucose result.

Additional thin-film electrodes were tested using the Type 1 Linear Sweep Voltammetry Test. In more detail, thin-film electrodes formed with Cr:C 100:0 (using only a Cr source), Cr:C 70:30, and Cr:C 50:50, were tested, where the thin-film electrodes were produced in a roll-to-roll sputter coater.

Figure 5:
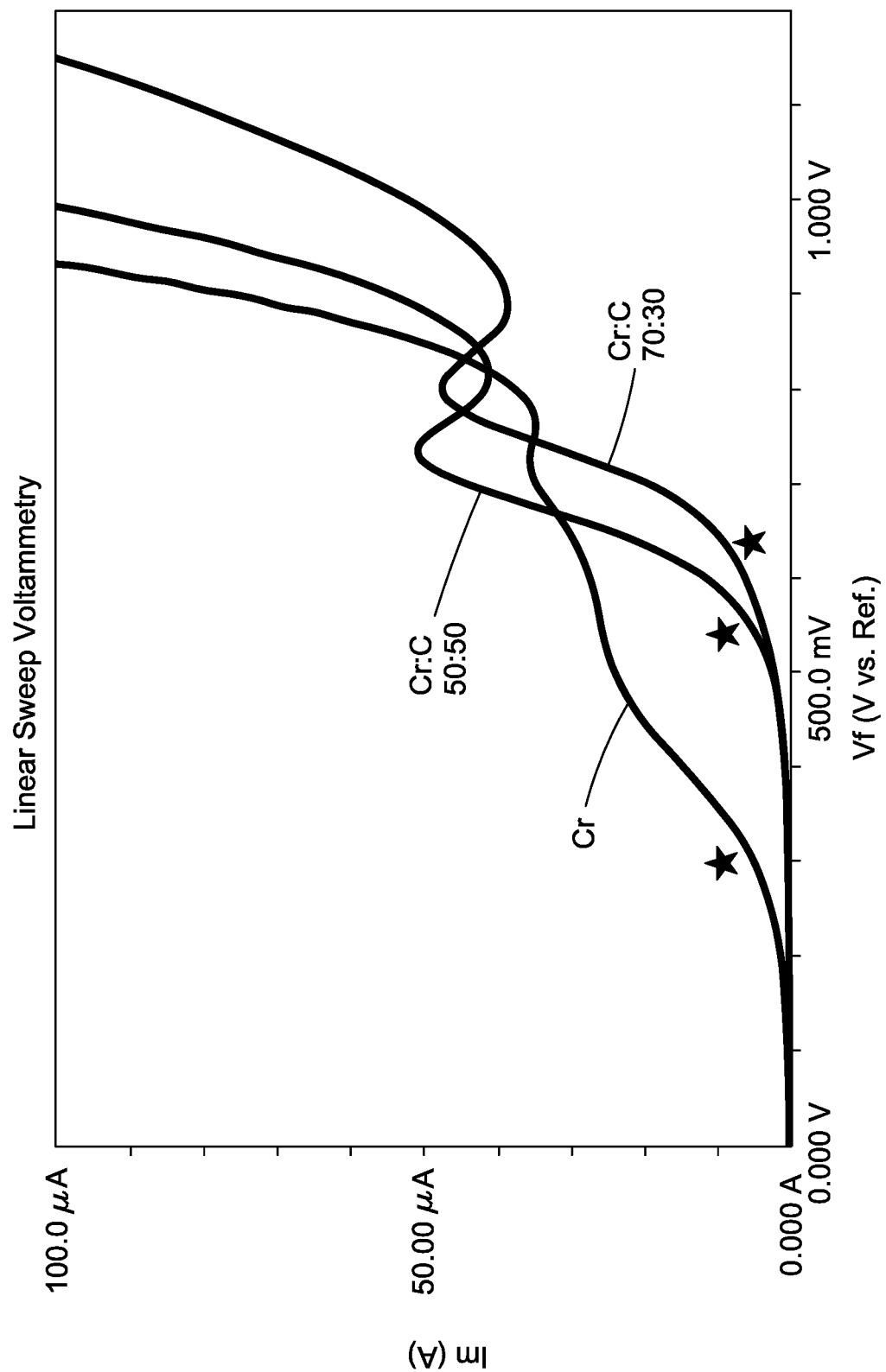
FIG. 5 is a graph depicting a linear sweep voltammogram plot of thin-film electrodes comparing various Cr and CrC composite films in buffer solutions.

The results of such tests for the Cr and C composite having 100, 70 and 50 at % Cr are illustrated graphically in FIG. 5. Similar to FIG. 4, FIG. 5 is a plot of a Type 1 linear sweep voltammetry test conducted on the Cr, and Cr and C composite, films using a mediator-free phosphate buffer solution and illustrates the background current or anodic stability of the films as a function of carbon content. As illustrated in FIG. 5, the thin-film electrodes show that anodic breakdown continues to improve as the carbon content increases.

Example 2—Application of Type 1 Cyclic Sweep
Voltammetry Test to Thin-Film Electrodes Example 2A—Cr and C Composite Films A plurality of different thin-film electrodes were tested using the Type 1 Cyclic Sweep Voltammetry Test. In more detail, thin-film electrodes formed with Cr:C 100:0 (or pure Cr), Cr:C 80:20, Cr:C 70:30, Cr:C 50:50, and Cr:C 30:70, were tested, where the thin-film electrodes were produced using the batch deposition process described above.

Cyclic voltammograms in PBS, with 1 mM Fe(II)[CN]6 mediator, at 25 mV/s using a saturated calomel (SCE) reference electrode and each of the Cr, or Cr and C composite, electrodes as the working electrode. The results are illustrated graphically in FIG. 6. A review of FIG. 6 reveals that the electron transfer kinetics between the mediator and electrode increased as the carbon content of the composite increased.

Additional thin-film electrodes were tested using the Type 1 Cyclic Sweep Voltammetry Test. In more detail, thin-film electrodes formed with Cr:C 100:0 (using only a Cr source), Cr:C 70:30, and Cr:C 50:50, were tested, where the thin-film electrodes were produced in a roll-to-roll sputter coater.

Figure 6:
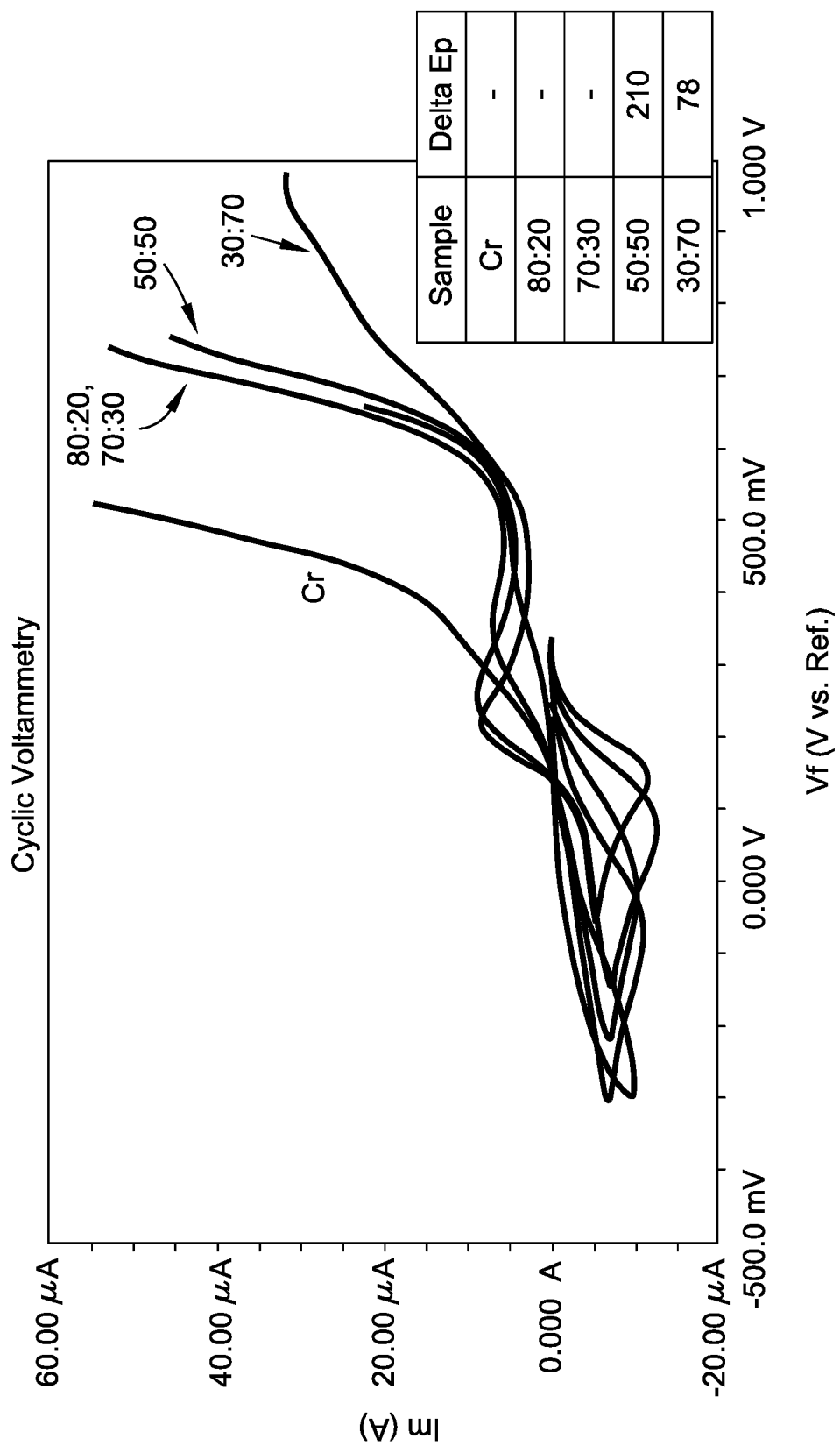
FIG. 6 is a graph depicting a cyclic sweep voltammogram plot of thin-film electrodes comparing Cr and CrC composite films containing varying amounts of C, each in Fe(II)[CN]$_6$ mediator-containing buffer solutions.
Figure 7:
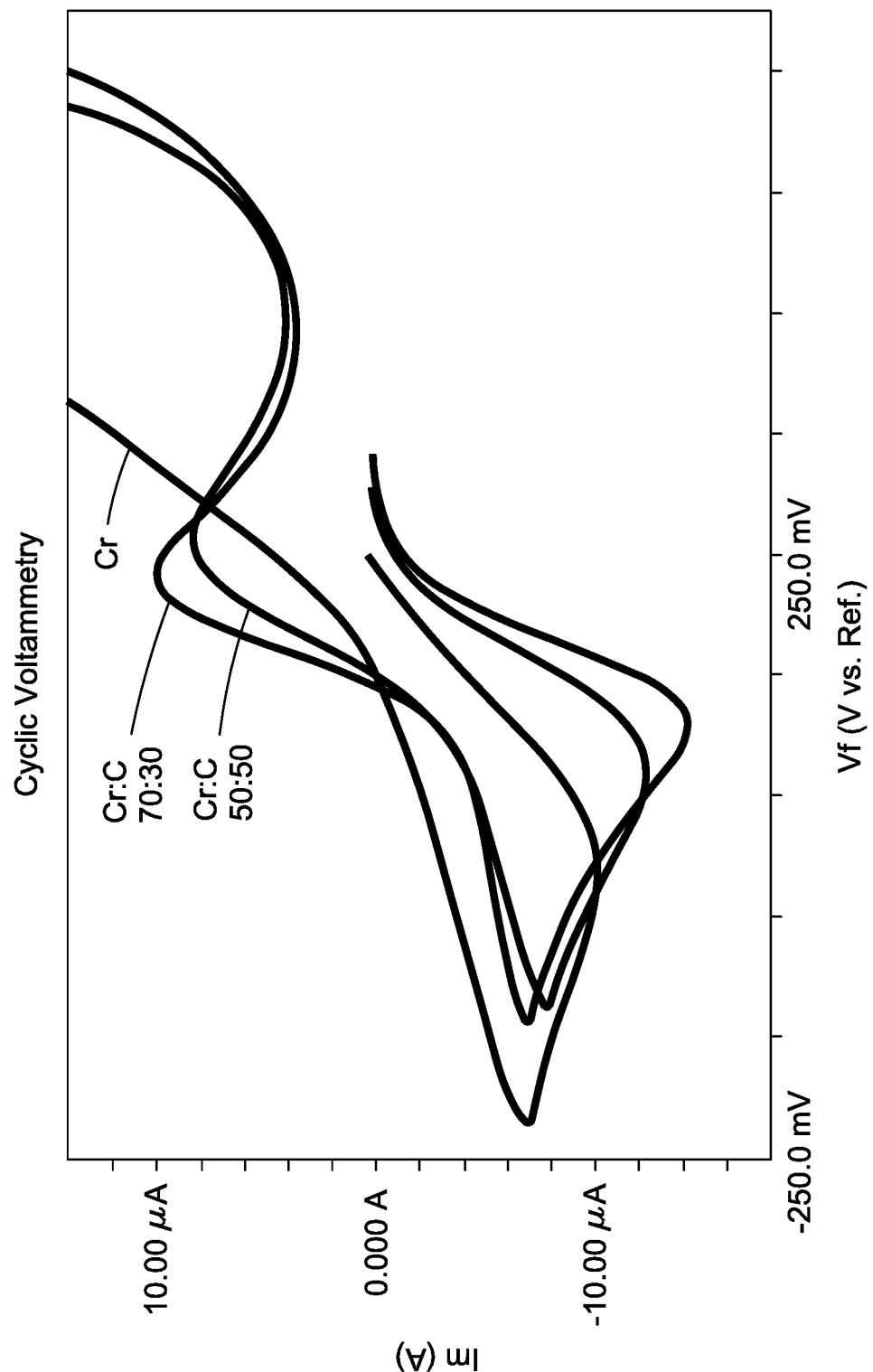
FIG. 7 is a graph depicting a cyclic sweep voltammogram plot of thin-film electrodes comparing Cr and CrC composite films containing varying amounts of C, each in Fe(II)[CN]$_6$ mediator-containing buffer solutions.

The results of such tests for the Cr and C composites having 100, 70 and 50 at % Cr are illustrated graphically in FIG. 7. Similar to FIG. 6, FIG. 7 is a plot of a Type 1 cyclic sweep voltammetry test conducted on the Cr, and Cr and C composite, films using PBS, with 1 mM Fe(II)[CN]6 mediator, at 25 mV/s using a saturated calomel (SCE) reference electrode, and illustrates the that the electron transfer kinetics between the mediator and electrode increased as the carbon content of the composite increased. Also, there was a decrease in potential difference of the peak currents of the anodic and cathodic wave, indicating that there was an increase in electron transfer rate.

Example 2B—Mo and C Composite Films

A plurality of different thin-film electrodes were tested using the Type 1 Cyclic Sweep Voltammetry Test. In more detail, thin-film electrodes formed with Mo:C 100:0 (using only a Mo source), Mo:C 70:30, Mo:C 50:50, and Mo:C 30:70, were tested, where the thin-film electrodes were produced using the batch deposition process described above.

Figure 8:
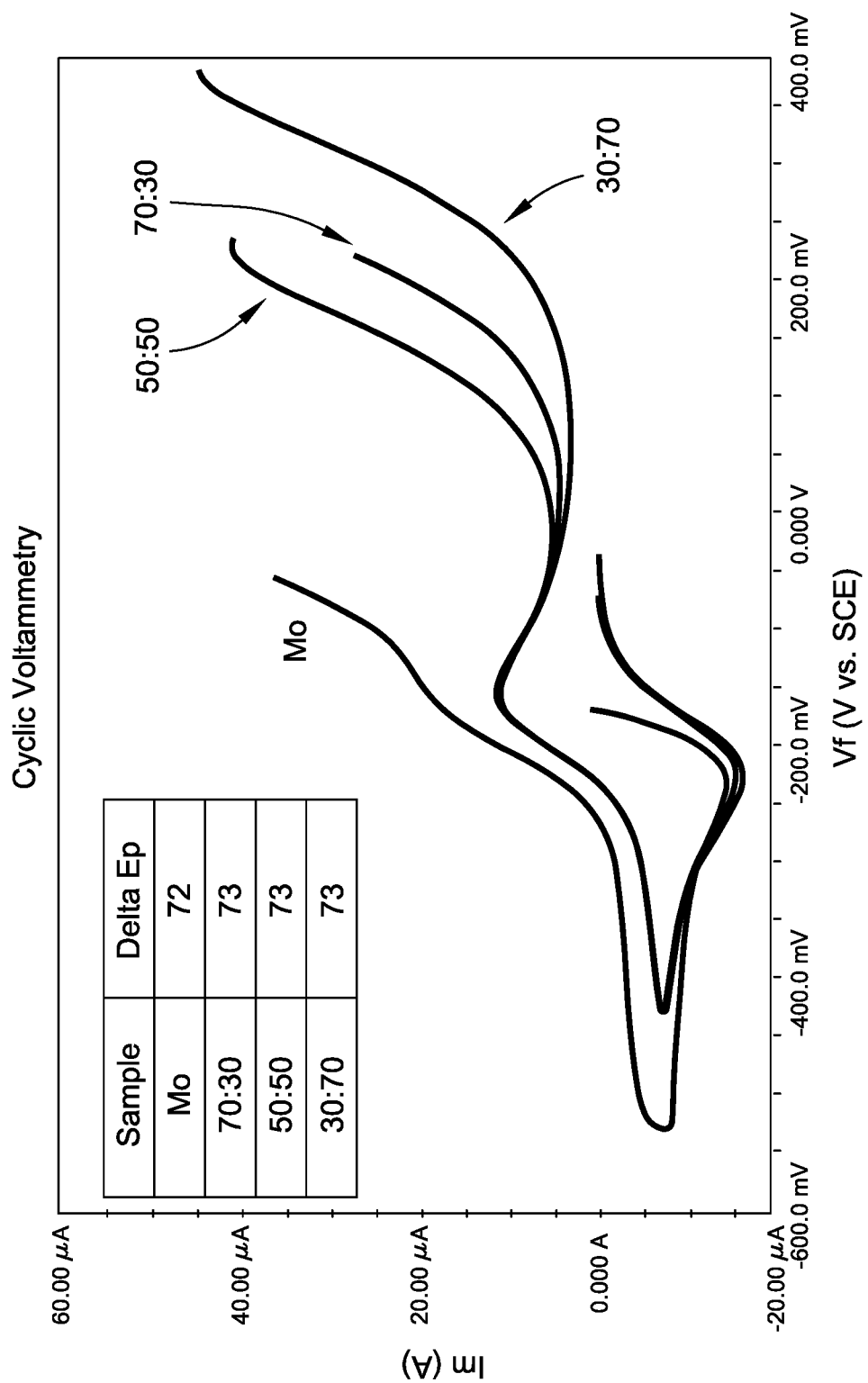
FIG. 8 is a graph depicting a cyclic sweep voltammogram plot of thin-film electrodes comparing Mo and MoC composite films containing varying amounts of C, each in [RuIII(NH$_3$)$_6$] Cl$_3$ mediator-containing buffer solutions.

Cyclic voltammograms in PBS, with with 2 mM [RuIII(NH3)6]Cl3 mediator, at 25 mV/s using a saturated calomel (SCE) reference electrode and each of the Mo, or Mo and C composite, electrodes as the working electrode. The results are illustrated graphically in FIG. 8. A review of FIG. 8 reveals that the anodic stability improved as the carbon content of the composite increased.

Example 2C—Cr and Si Composite Films

Thin-film electrodes were tested using the Type 1 Cyclic Sweep Voltammetry Test using thin-film electrodes formed with Cr and formed with a Cr:Si (50:50 at %) composite, where the thin-film electrodes were produced using the batch deposition process described above.

Figure 9:
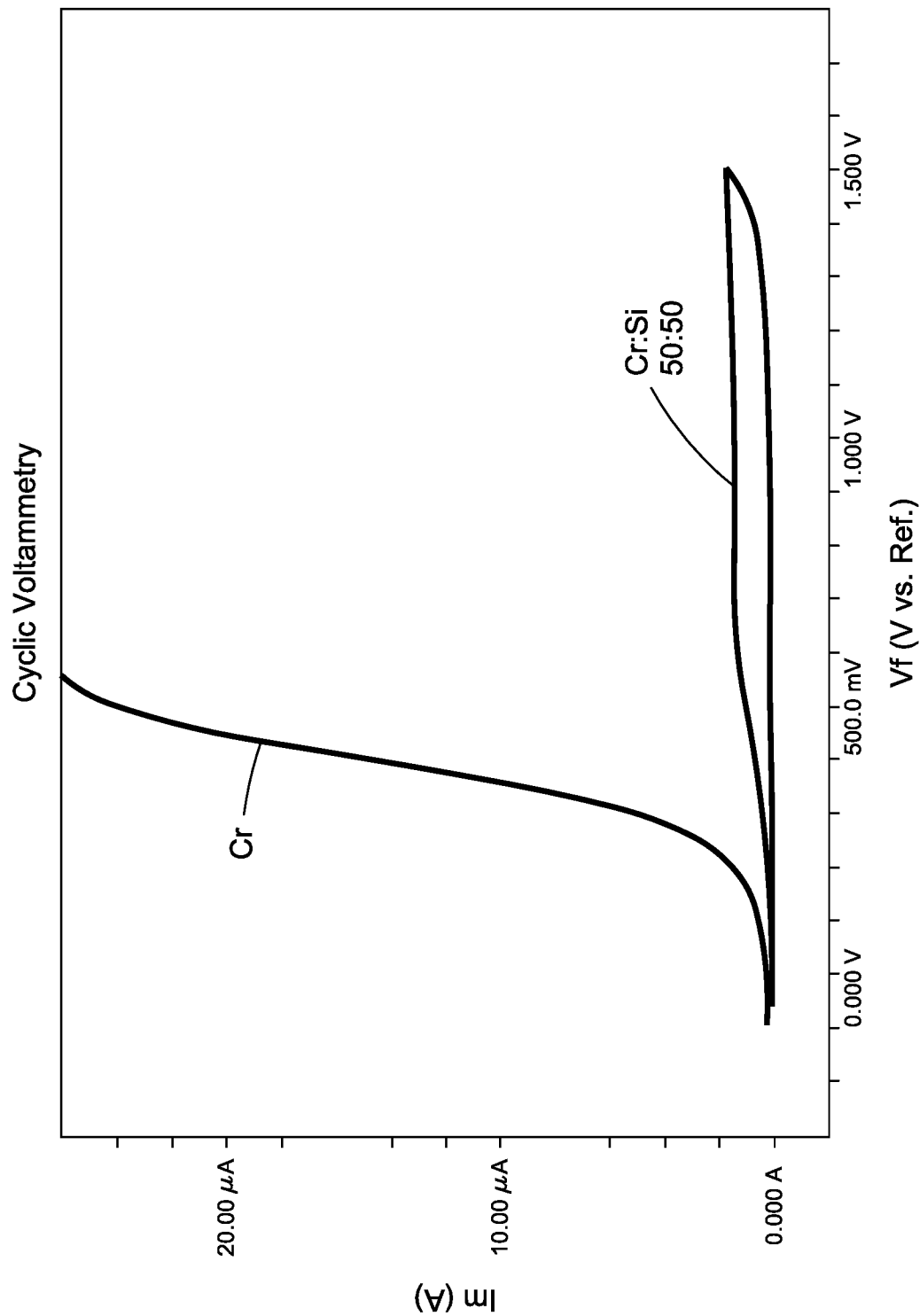
FIG. 9 is a graph depicting a cyclic sweep voltammogram plot of thin-film electrodes comparing a Cr film and a 50:50 at % Cr:Si composite film in buffer solutions.

Cyclic voltammograms in PBS, with no mediator, at 25 mV/s using a saturated calomel (SCE) reference electrode and each of the Cr, and Cr and Si composite, electrodes as the working electrode. The results are illustrated graphically in FIG. 9. A review of FIG. 9 reveals that because of the suppressed background current observed in the CrSi composite film, the data indicates an increase in anodic stability compared to just a Cr film.

The thin-film Cr and CrSi composite electrodes were tested using the Type 1 Cyclic Sweep Voltammetry Test with a [RuIII(NH3)6]Cl3 mediator.

Figure 10:
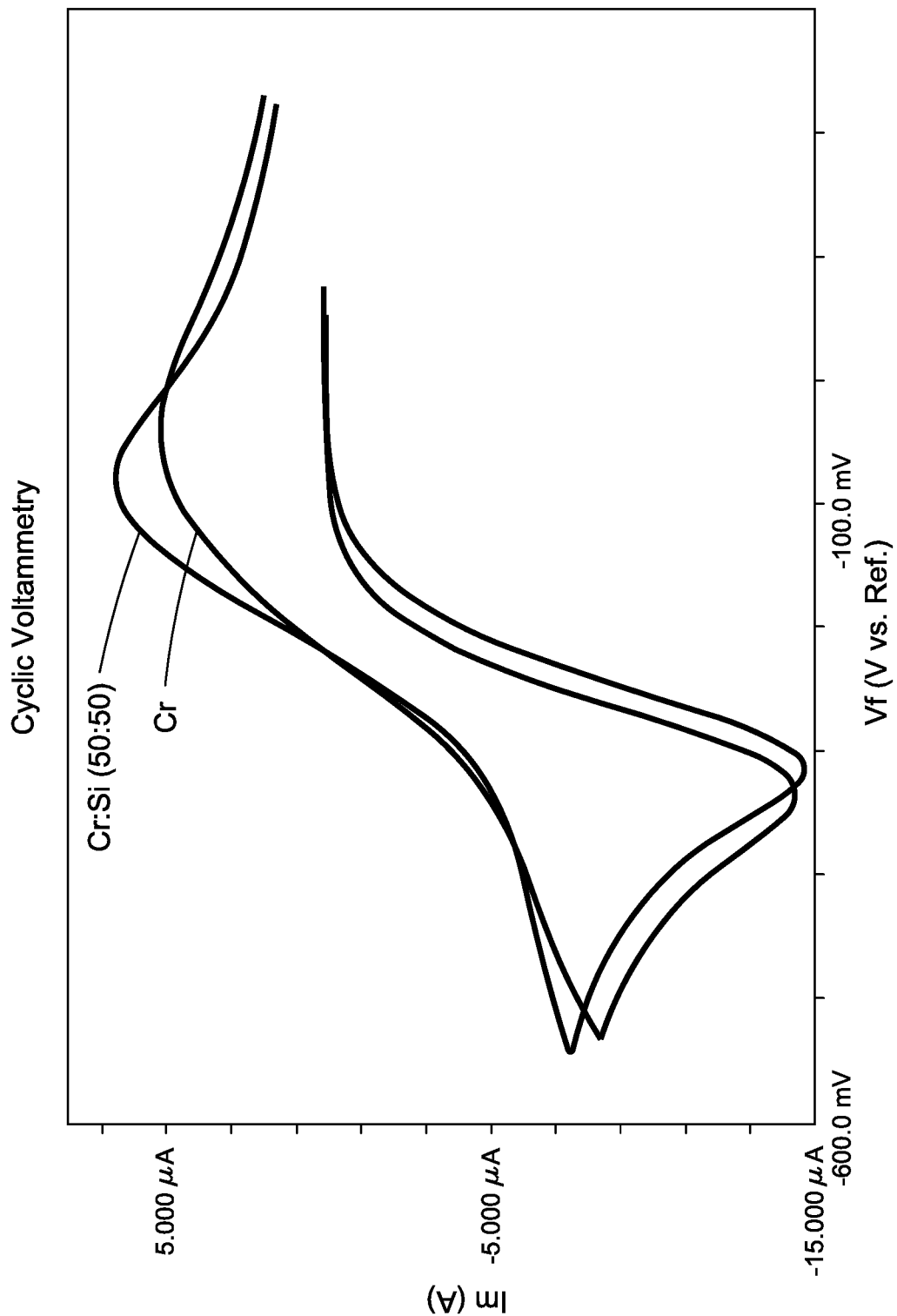
FIG. 10 is a graph depicting a cyclic sweep voltammogram plot of thin-film electrodes comparing a Cr film and a 50:50 at % Cr:Si composite film containing varying amounts of C, each in [RuIII(NH$_3$)$_6$] Cl$_3$ mediator-containing buffer solutions.

Cyclic voltammograms in PBS, with with 2 mM [RuIII(NH3)6]Cl3 mediator, at 25 mV/s using a saturated calomel (SCE) reference electrode and each of the Cr, or CrSi composite, electrodes as the working electrode. The results are illustrated graphically in FIG. 10. A review of FIG. 10 illustrates that the electron transfer kinetics between the mediator and electrode increased for the CrSi composite film compared to just the Cr film.

The above detailed description of embodiments of the disclosure is intended to describe various aspects of the invention in sufficient detail to enable those skilled in the art to practice the invention. Other embodiments can be utilized and changes can be made without departing from the scope of the invention. The above detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

The inventors hereby state their intent to rely on the Doctrine of Equivalents to determine and assess the reasonably fair scope of the present disclosure as it pertains to any apparatus not materially departing from but outside the literal scope of the invention as set forth in the following claims.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.'

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A biosensor component for use in analyzing a biological sample, said biosensor component comprising:
   a substrate;
   a composite layer deposited on said substrate; and
   a biological reactant for electrochemically reacting with said biological sample,
   wherein said composite layer comprises a conductive metal component and a resistive material component;
   wherein said conductive metal component comprises one or more non-noble metals, and
   wherein a weight percent of the resistive material component in the composite layer is greater than 20 weight percent.

2. The biosensor component according to claim 1, wherein said biosensor component comprises an electrode chosen from a working electrode or a reference electrode or a counter electrode.

3. The biosensor component according to claim 1, wherein said biosensor component is a blood glucose sensor and said biosensor component comprises a test-strip.

4. The biosensor component according to claim 1, wherein the conductive metal component is chromium.

5. The biosensor component according to claim 1, wherein the conductive metal component comprises nickel.

6. The biosensor component according to claim 1, wherein the conductive metal component comprises a NiCr alloy.

7. The biosensor component according to claim 6, wherein a weight percent of the chromium is in a range from about 25 to about 95 weight percent, based on a total weight of the conductive metal component.

8. The biosensor component according to claim 7, wherein a weight percent of the chromium in the conductive metal component is in a range from greater than 50 to about 95 weight percent; and wherein the balance of the conductive metal component is essentially nickel.

9. The biosensor component according to claim 7, wherein the conductive metal component further comprises iron; wherein the weight percent of the chromium in the conductive metal component is greater than 10, a weight percent of the nickel in the conductive metal component is greater than 4 weight percent, and a weight percent of the iron in the conductive metal component is greater than 2 weight percent.

10. The biosensor component according to claim 1, wherein the conductive metal component comprises nickel, chromium and iron; wherein the combined weight percent of the nickel and chromium in the conductive metal component is in a range of 24 to 95 weight percent, based on a total weight of the conductive metal component equaling 100 weight percent; and wherein a weight percent of the iron in the conductive metal component is in a range of greater than 2 weight percent, based on the total weight of the conductive metal component equaling 100 weight percent.

11. The biosensor component according to claim 10, wherein the combined weight percent of the nickel and chromium in the conductive metal component is in a range of 24 to 95 weight percent, the weight percent of the nickel in the conductive metal component is in a range from 7 to less than 12 weight percent, and the weight percent of the chromium in the conductive metal component is in a range of greater than 13 to less than 22 weight percent, based on the total weight of the conductive metal component equaling 100 weight percent; and wherein the weight percent of the iron in the conductive metal component is in a range of 5 weight percent to less than 75 weight percent, based on the total weight of the conductive metal component equaling 100 weight percent.

12. The biosensor component according to claim 1, wherein the conductive metal component comprises nickel, chromium, and iron, wherein a combined weight percent of the nickel and chromium in the conductive metal component is in a range of 80 to less than 95 weight percent, based on the total weight of the conductive metal component equaling 100 weight percent; and wherein the weight percent of the iron in the conductive metal component is in a range of greater than 5 weight percent to less than 12 weight percent, based on the total weight of the conductive metal component equaling 100 weight percent.

13. The biosensor component according to claim 12, wherein the weight percent of the nickel in the conductive metal component is greater than 70 weight percent, and the weight percent of the chromium in the conductive metal component is in a range of greater than 13 to less than 20 weight percent, based on the total weight of the conductive metal component equaling 100 weight percent.

14. The biosensor component according to claim 1, wherein the conductive metal component comprises nickel, chromium and iron; wherein the combined weight percent of the nickel and chromium in the conductive metal component is in a range of 24 to 90 weight percent, based on the total weight of the conductive metal component equaling 100 weight percent; and wherein the weight percent of the iron in the conductive metal component is in a range of greater than 5 weight percent to less than 75 weight percent, based on the total weight of the conductive metal component equaling 100 weight percent.

15. The biosensor component according to claim 14, wherein the weight percent of the nickel in the conductive metal component is in a range from 8 to 72 weight percent, the weight percent of the chromium in the conductive metal component is in a range of 13 to 25 weight percent, wherein the weight percent of the iron in the conductive metal component is in a range of 6 to 74 weight percent, and wherein the weight percent of molybdenum in the conductive metal component is in a range from 0 to 10 weight percent, based on the total weight of the conductive metal component equaling 100 weight percent.

16. The biosensor component according to claim 1, wherein the conductive metal component comprises nickel, chromium and iron; wherein a combined weight percent of the nickel and chromium in the conductive metal component is in a range of 24 to 55 weight percent, based on a total weight of the conductive metal component equaling 100 weight percent; and wherein the weight percent of the iron in the conductive metal component is in a range of greater than 35 weight percent to less than 75 weight percent, based on the total weight of the conductive metal component equaling 100 weight percent.

17. The biosensor component according to claim 1, wherein the conductive metal component comprises nickel, chromium, iron, and molybdenum; wherein a weight percent of the nickel in the conductive metal component is in a range of 10 to 30 weight percent; wherein a weight percent of the chromium in the conductive metal component is in a range of 16 to 26 weight percent; wherein a weight percent of the iron in the conductive metal component is in the range of 35 to 75 weight percent; and wherein a weight percent of the molybdenum in the conductive metal component is in a range of 2 to 8 weight percent, based on the total weight of the conductive metal component equaling 100 weight percent.

18. The biosensor component according to claim 1, wherein the weight percent of the resistive material component in the composite layer is at least 30 weight percent.

19. The biosensor component according to any one of the preceding claims, wherein the resistive material component comprises carbon, said substrate comprises a flexible, non-conductive film, and said biosensor component has a visible light transmission of no more than 20%.

20. A method for forming the biosensor component of claim 1, comprising:
   (a) providing the substrate;
   (b) providing a composite material target, wherein the composite material target comprises a conductive metal component and a resistive material component, wherein the conductive metal component comprises one or more non-noble metals, and wherein a weight percent of resistive the resistive material component in the composite material target is greater than 20 weight percent;
   (c) physical vapor depositing at least a portion of said substrate with material from said composite material target to thereby form the composite layer on said substrate.

21. The method of claim 20, wherein said substrate comprise polyethylene terephthalate (PET), wherein said substrate has a thickness in the range from 25 and 500 µm, and said composite layer has a thickness of in the range from 15 and 400 nm, wherein said biosensor component has a visible light transmission of no more than 20%, wherein the biosensor component comprises a blood glucose sensor, and wherein the resistive material component comprises carbon.

\* \* \* \* \*